United States Patent
Quinlan, Jr. et al.

(10) Patent No.: US 7,165,776 B2
(45) Date of Patent: Jan. 23, 2007

(54) PIVOTABLE TRAY FOR A PALLET TRUCK

(75) Inventors: Roger Jerome Quinlan, Jr., Troy, OH (US); Eric James Hanson, St. Marys, OH (US); Gary Lester Topp, New Bremen, OH (US)

(73) Assignee: Crown Equipment Corporation, New Bremen, OH (US)

( * ) Notice: Subject to any disclaimer, the term of this patent is extended or adjusted under 35 U.S.C. 154(b) by 277 days.

(21) Appl. No.: 10/847,145

(22) Filed: May 17, 2004

(65) Prior Publication Data

US 2004/0265113 A1 Dec. 30, 2004

Related U.S. Application Data

(60) Provisional application No. 60/472,759, filed on May 22, 2003.

(51) Int. Cl.
*B60P 1/02* (2006.01)

(52) U.S. Cl. .............................. 280/43.12; 280/47.29; 280/651; 211/207

(58) Field of Classification Search ........... 280/33.992, 280/651, 43, 43.12, 47.29; 211/207, 208; 224/411
See application file for complete search history.

(56) References Cited

U.S. PATENT DOCUMENTS

| | | | |
|---|---|---|---|
| 3,758,075 A * | 9/1973 | Briggs | 254/2 R |
| 4,589,669 A * | 5/1986 | Kedem | 280/43.12 |
| 4,753,419 A | 6/1988 | Johansson | |
| 4,884,936 A * | 12/1989 | Kawada | 414/498 |
| 5,403,024 A * | 4/1995 | Frketic | 280/43.12 |
| 5,752,584 A * | 5/1998 | Magoto et al. | 187/234 |
| 5,829,948 A | 11/1998 | Becklund | |
| 5,890,562 A * | 4/1999 | Bartels et al. | 187/224 |
| 6,174,124 B1 * | 1/2001 | Haverfield et al. | 414/642 |
| 6,530,740 B1 * | 3/2003 | Kim | 414/490 |
| 6,540,241 B1 * | 4/2003 | Lee | 280/43.12 |
| 6,557,869 B1 * | 5/2003 | Gillette et al. | 280/47.28 |
| 6,971,654 B1 * | 12/2005 | Amsili | 280/47.2 |
| 2001/0038786 A1 * | 11/2001 | Kim | 414/490 |
| 2002/0030351 A1 * | 3/2002 | Gillette et al. | 280/652 |
| 2003/0197351 A1 * | 10/2003 | Burger et al. | 280/651 |
| 2004/0256818 A1 * | 12/2004 | Amsili | 280/47.29 |
| 2005/0116432 A1 * | 6/2005 | Borrmann | 280/43.12 |

FOREIGN PATENT DOCUMENTS

AU WO 92/13745 * 8/1992
GB 2292730 A * 3/1996

OTHER PUBLICATIONS

Crown; PTH 50 Series Specifications and Technical Information; Apr. 1994; SF-12208; New Bremen Ohio.

* cited by examiner

*Primary Examiner*—J. Allen Shriver
(74) *Attorney, Agent, or Firm*—Stevens & Showalter LLP

(57) ABSTRACT

A pallet truck is provided comprising a steerable unit; a fork carriage; a set of forks coupled to the fork carriage; and a tray non-removably coupled to one of the fork carriage and the forks. The tray is movable between a workpiece-receiving position where the tray rests on the forks and a stowed position where the tray is disengaged from the forks.

18 Claims, 20 Drawing Sheets

PIVOTABLE TRAY FOR A PALLET TRUCK

CROSS REFERENCE TO RELATED APPLICATION

This application claims the benefit of U.S. Provisional Patent Application Ser. No. 60/472,759, filed May 22, 2003, entitled "PIVOTABLE TRAY FOR A PALLET TRUCK", which is incorporated herein by reference.

BACKGROUND OF THE INVENTION

U.S. Pat. No. 6,174,124 to Haverfield et al. discloses a work assist vehicle comprising a personnel compartment and a load tray, both coupled to a vertically moveable mast. The load tray is pivotable. The vehicle does not include a set of forks.

Pending Patent Application, U.S. Ser. No. 10/421,090, entitled "WORK ASSIST ACCESSORY FOR PALLET TRUCKS AND PALLET TRUCKS INCLUDING WORK ASSIST FEATURES," filed on Apr. 23, 2003, by Burger et al., the disclosure of which is incorporated herein by reference, discloses a pallet truck comprising a set of forks and a work tray. The tray is adjustably mounted to a generally upright extension. The tray is always maintained a spaced distance away from the forks so as not to contact the forks.

It is also known in the art to provide a tray for a pallet truck which is manually placed on and removed from a pair of pallet truck forks. The tray functions to provide a surface to move non-palletized products or simply to provide a surface on which to work. The tray is not permanently coupled to the truck and, hence, requires an operator to manually place the tray on the forks, which operation is time consuming and physically difficult, and further requires the operator to remove the tray from the forks when a load is to be placed directly on the forks.

Accordingly, there is a need for a work tray which is non-removably coupled to a pallet truck and which can be moved between a stowed position so as to allow a load to be placed directly on a set of forks and a workpiece-receiving position so as to allow workpieces, which would be difficult to support and balance directly on the forks, to be placed directly on the tray.

SUMMARY OF THE INVENTION

These needs are met by the present invention wherein a pallet truck is provided comprising a work tray non-removably coupled to the pallet truck. The tray can be moved between a stowed position so as to allow a load to be placed directly on a set of forks and a workpiece-receiving position so as to allow workpieces, which would be difficult to support and balance directly on the forks, to be placed directly on the tray.

DETAILED DESCRIPTION OF THE INVENTION

Figure 1:
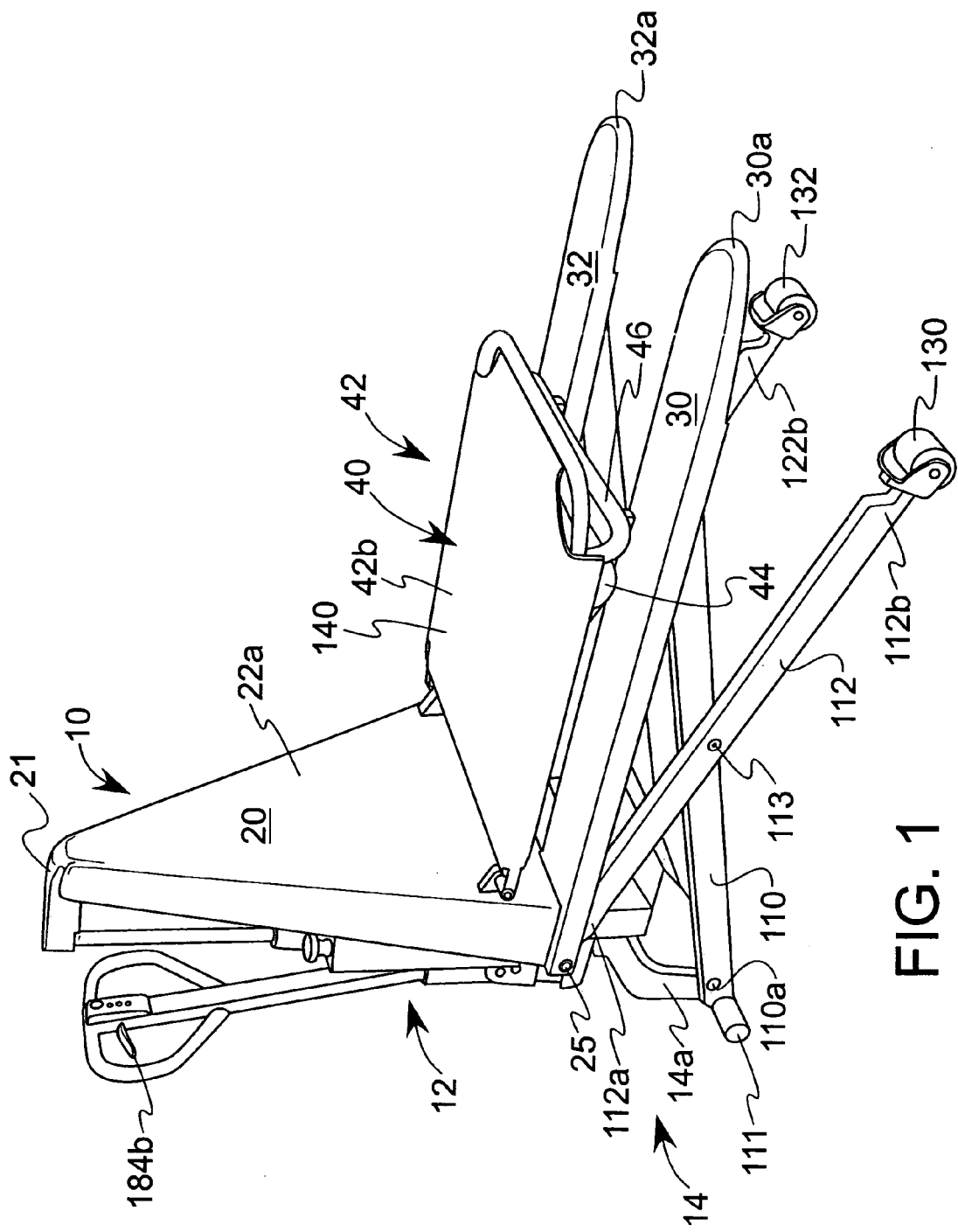
FIGS. 1 and 2 are perspective views of a pallet truck constructed in accordance with a first embodiment of the present invention including a tray pivotably coupled to a fork carriage, wherein the tray is shown in its workpiece-receiving position.
Figure 2:
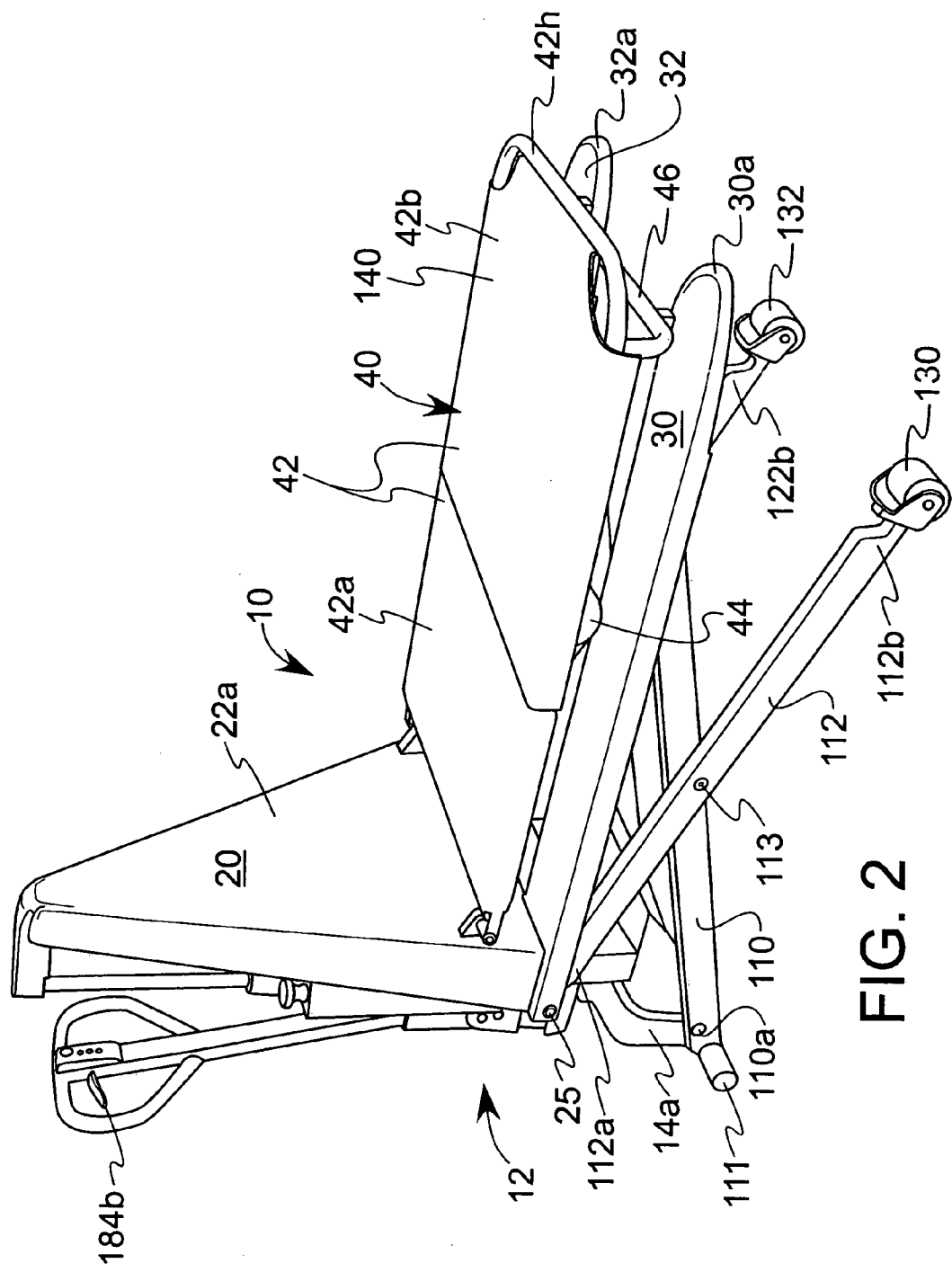

A pallet truck 10 constructed in accordance with a first embodiment of the present invention is illustrated in FIGS. 1 and 2. The pallet truck 10 comprises a steerable support unit 12, a fork carriage 20, first and second forks 30 and 32, and a tray 40. In the illustrated embodiment, the forks 30 and 32 are weldably coupled to the fork carriage 20 so as to be fixed to the carriage 20. The forks 30 and 32 extend away from the carriage 20 and are substantially parallel to one another. The forks 30 and 32 may alternatively be coupled to the carriage 20 so as to be movable relative to one another and the carriage 20.

The tray 40 is non-removably coupled to the fork carriage 20. More specifically and as will be discussed further below, the tray 40 is pivotably coupled to the fork carriage 20 so as to be movable between a workpiece-receiving position, where the tray 40 rests on the forks 30 and 32, see FIGS. 1 and 2, and a stowed position, where the tray 40 is disengaged from the forks 30 and 32, see FIGS. 3 and 4. When in the workpiece-receiving position, the tray 40 is adapted to receive on its upper surface 140 a workpiece (not shown), such as a boxed television, a small engine, a transmission, etc, which would be difficult to support and balance directly on the forks 30 and 32. "Non-removably coupled," as used herein, means that the tray 40 is permanently coupled to the carriage 20 during normal use and operation of the truck 10, but is capable of being disconnected from the fork carriage 20 for repair, service, etc.

Figure 3:
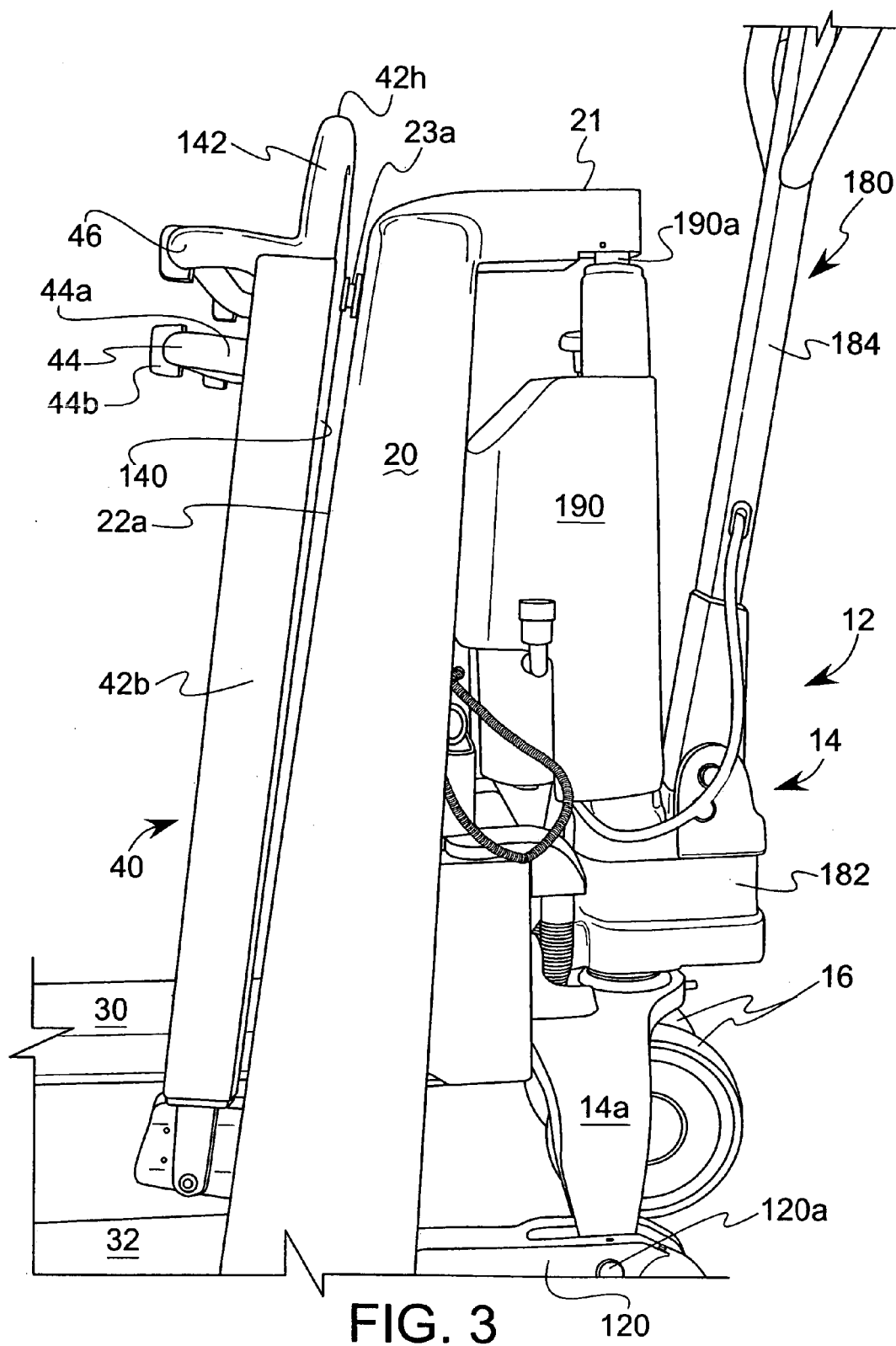
FIG. 3 is a side view of a steerable unit, fork carriage and tray of the truck illustrated in FIGS. 1 and 2.
Figure 4:
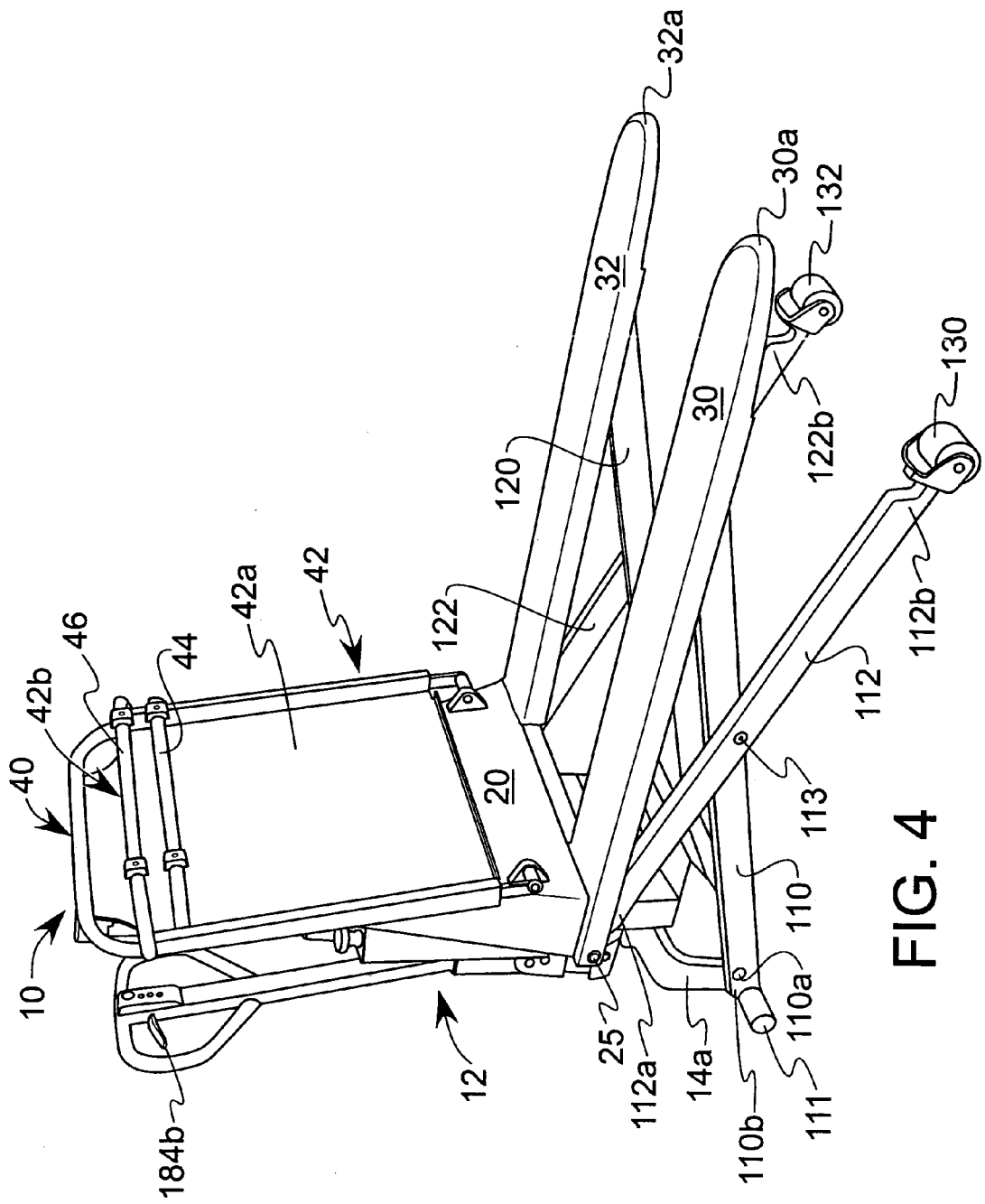
FIG. 4 is a perspective view of the pallet truck illustrated in FIGS. 1 and 2, wherein the tray is shown in its stowed position.
Figure 5:
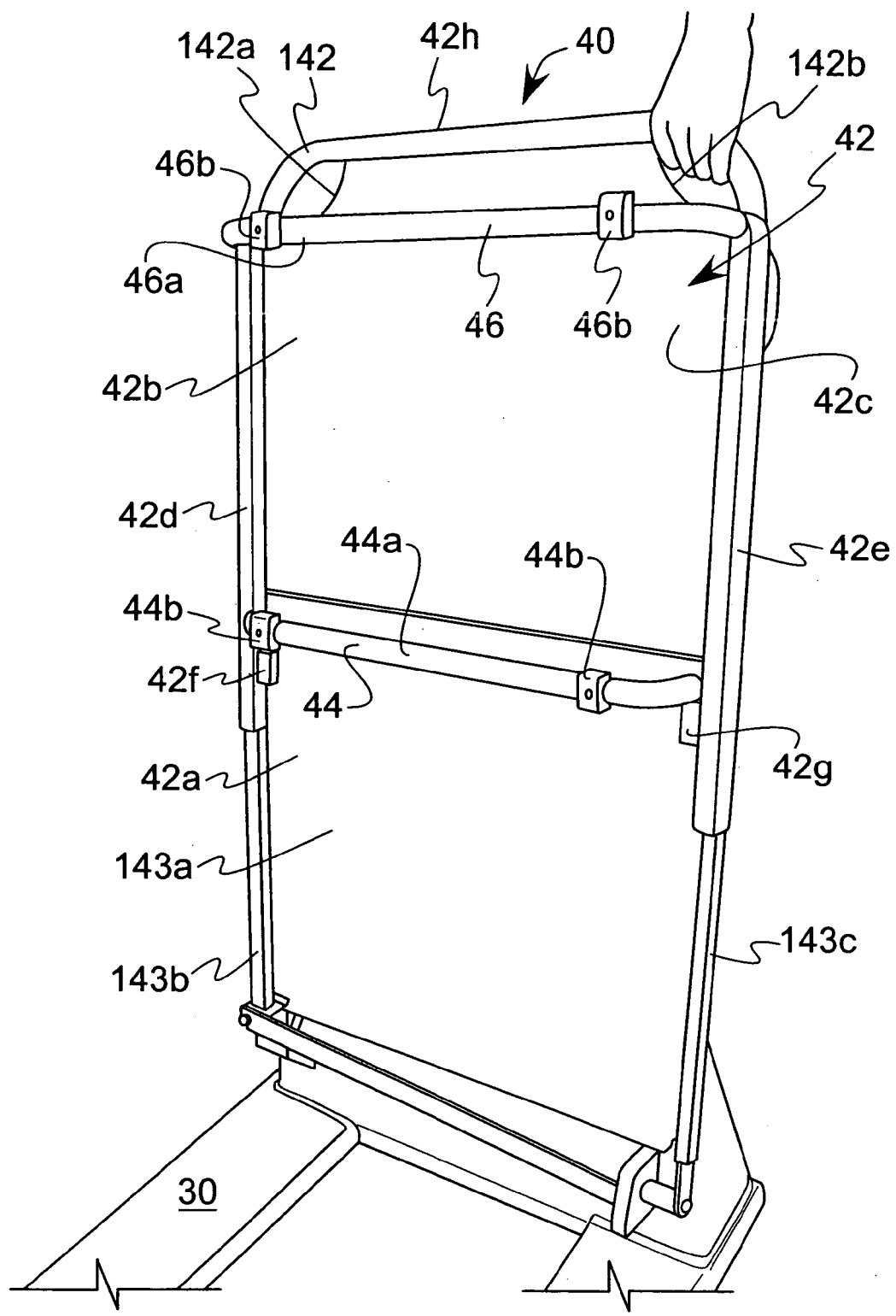
FIG. 5 is a perspective view illustrating the tray in its stowed position with the second section of the tray fully extended.
Figure 13:
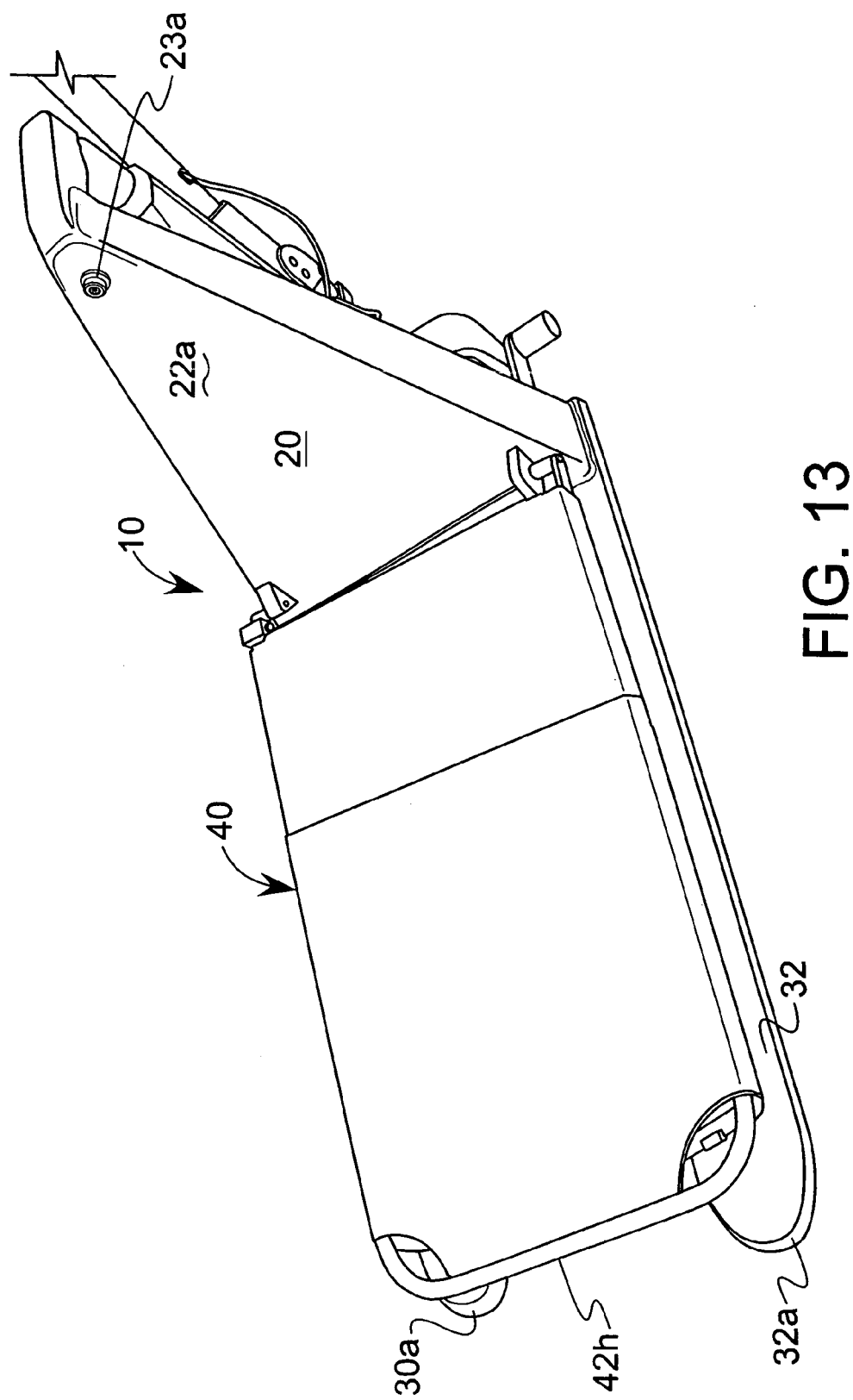
FIG. 13 is a perspective view of the pallet truck illustrated in FIGS. 1 and 2 with the tray second section fully extended.

The tray 40 comprises a substantially planar workpiece-receiving structure 42 and first and second support elements 44 and 46, respectively, weldably coupled to the planar workpiece-receiving structure 42, see 4 and 5. The workpiece-receiving structure 42 comprises first and second sections 42a and 42b, respectively, see FIGS. 1, 2, 4 and 5. As will be discussed further below, the first section 42a is pivotably coupled to the fork carriage 20, while the second section 42b is movably mounted to the first section 42a. Because the second section 42b is movably mounted to the first section 42a, the second section 42b may be reciprocated relative to the first section 42a between a fully retracted state or position, as illustrated in FIGS. 1, 3 and 4, and a fully extended state or position, as illustrated in FIGS. 2 and 5. When the tray 40 is in its workpiece-engaging position and the second section 42b is in its fully extended state, a distal end 42h of the second section 42b is positioned slightly inboard or substantially in-line with distal ends 30a and 32a of the forks 30 and 32, see FIGS. 2 and 13. It is alternatively contemplated that the second section distal end 42h may extend up to about 6 inches beyond the distal ends 30a, 32a of the forks 30, 32 or may extend up to about 6 inches inboard of the distal ends 30a, 32a of the forks 30, 32. However, it is preferred that the distal end 42h of the second section 42b be positioned slightly inboard of the fork distal ends 30a, 32a so as to maximize the length of the working surface of the tray 40 yet protect the tray 40 from objects which the truck 10 may contact during operation, i.e., the forks 30, 32, rather than the distal end 42h of the tray section 42b, contact any objects which may be positioned along the path of travel of the truck 10.

Figure 11:
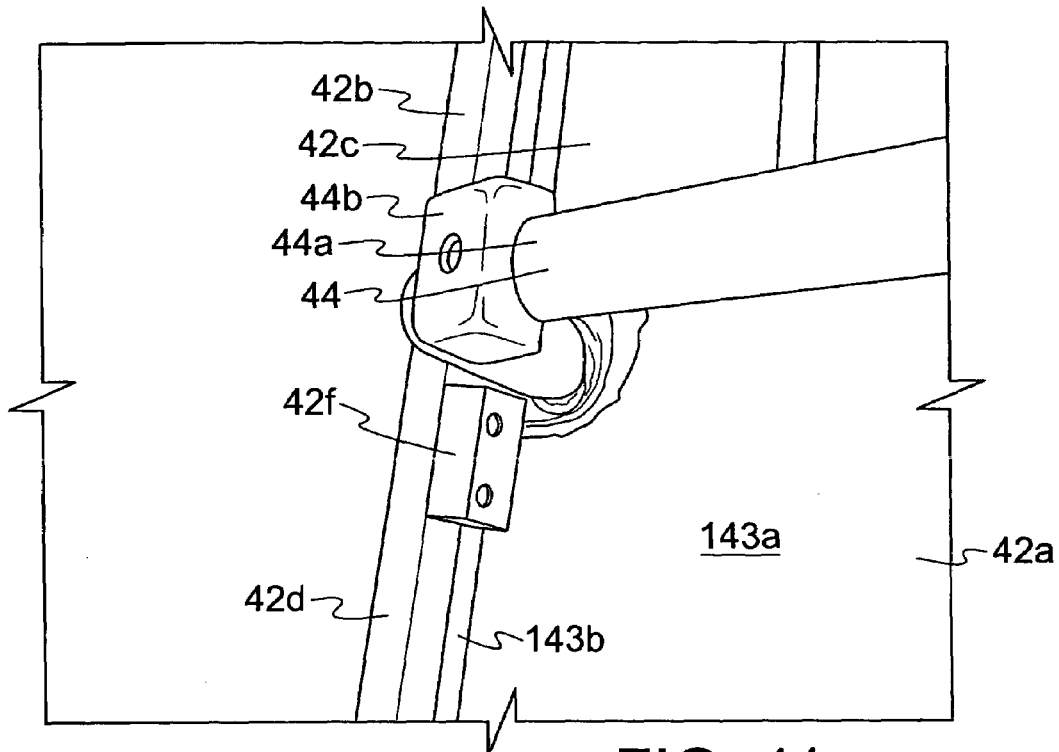
FIGS. 11 and 12 are views illustrating a stop fixedly coupled to a second section of the tray for engaging a first support element of a first section of the tray so as to limit the movement of the tray second section.
Figure 12:
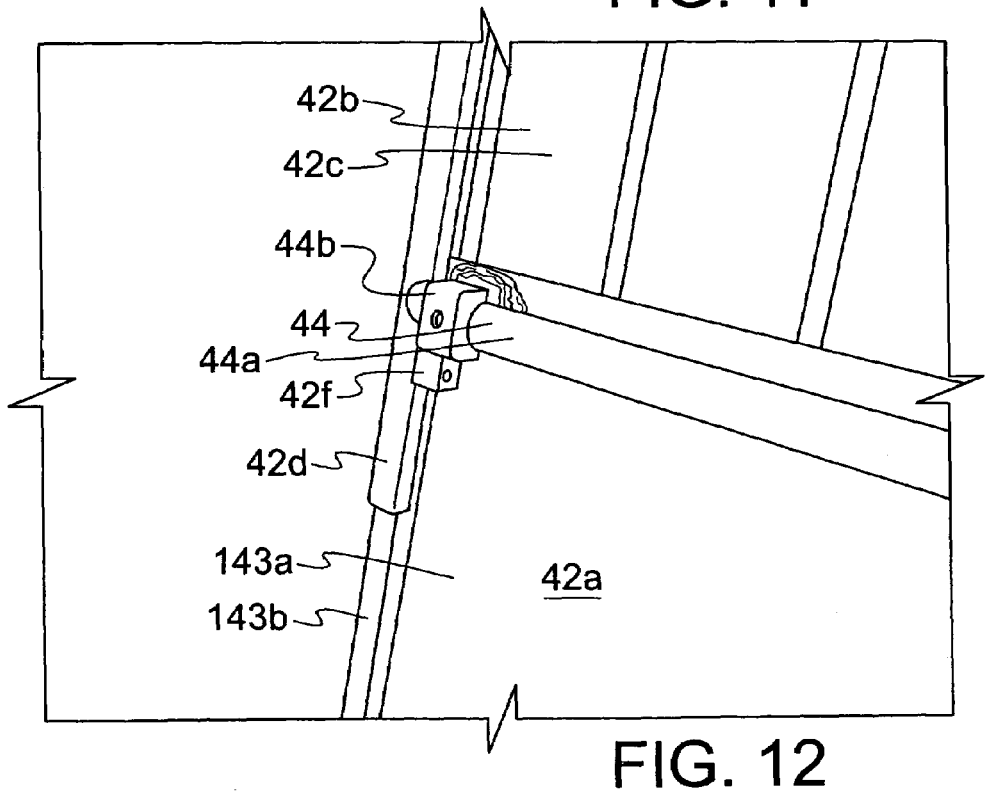

In the illustrated embodiment, the first support element 44 comprises a substantially U-shaped tubular member 44a and a pair of polymeric material engaging feet 44b, see FIGS. 5, 11 and 12. The feet 44b are secured to the tubular member 44a for contacting the forks 30, 32 when the tray 40 is in its workpiece-receiving position. The second support element 46 also comprises a substantially U-shaped tubular member 46a and a pair of polymeric material engaging feet 46b, see FIG. 5. The feet 46b are secured to the tubular member 46a for contacting the forks 30, 32 when the tray 40 is in its workpiece-receiving position. The first support element 44 is weldably coupled to the underside of the first section 42a and the second support element 46 is weldably coupled to the underside of the second section 42b, see FIGS. 4 and 5.

As will be discussed further below, the steerable unit 12 comprises a hydraulic lift apparatus 180 capable of moving the forks 30, 32 in a vertical direction. In the illustrated embodiment, the forks 30, 32 are capable of being moved to a maximum height of about 31 inches. The combined height of the U-shaped member 44a, its corresponding engaging feet 44b and the first section 42a of the planar workpiece-receiving structure 42 as well as the combined height of the U-shaped member 46a, its corresponding engaging feet 46b and the second section 42b of the planar workpiece-receiving structure 42 are selected so as to permit the maximum working height of the tray 40 to be at a desired level, which, in the illustrated embodiment, is about 36 inches. Hence, in the illustrated embodiment, the combined height of the U-shaped member 44a, its corresponding feet 44b, and the first section 42a of the workpiece-receiving structure 42 comprises approximately 5 inches. Likewise, the combined height of the U-shaped member 46a, its corresponding feet 46b and the second section 42b of the workpiece-receiving structure 42 comprises approximately 5 inches. Of course, the combined height of the U-shaped member 44a, its corresponding engaging feet 44b and the first section 42a as well as the combined height of the U-shaped member 46a, its corresponding engaging feet 46b and the second section 42b will vary based on desired functions to be performed by the tray 40 and truck design. However, it is contemplated that the combined height may range from about 1 inch to about 12 inches and preferably about 5 inches.

Figure 6:
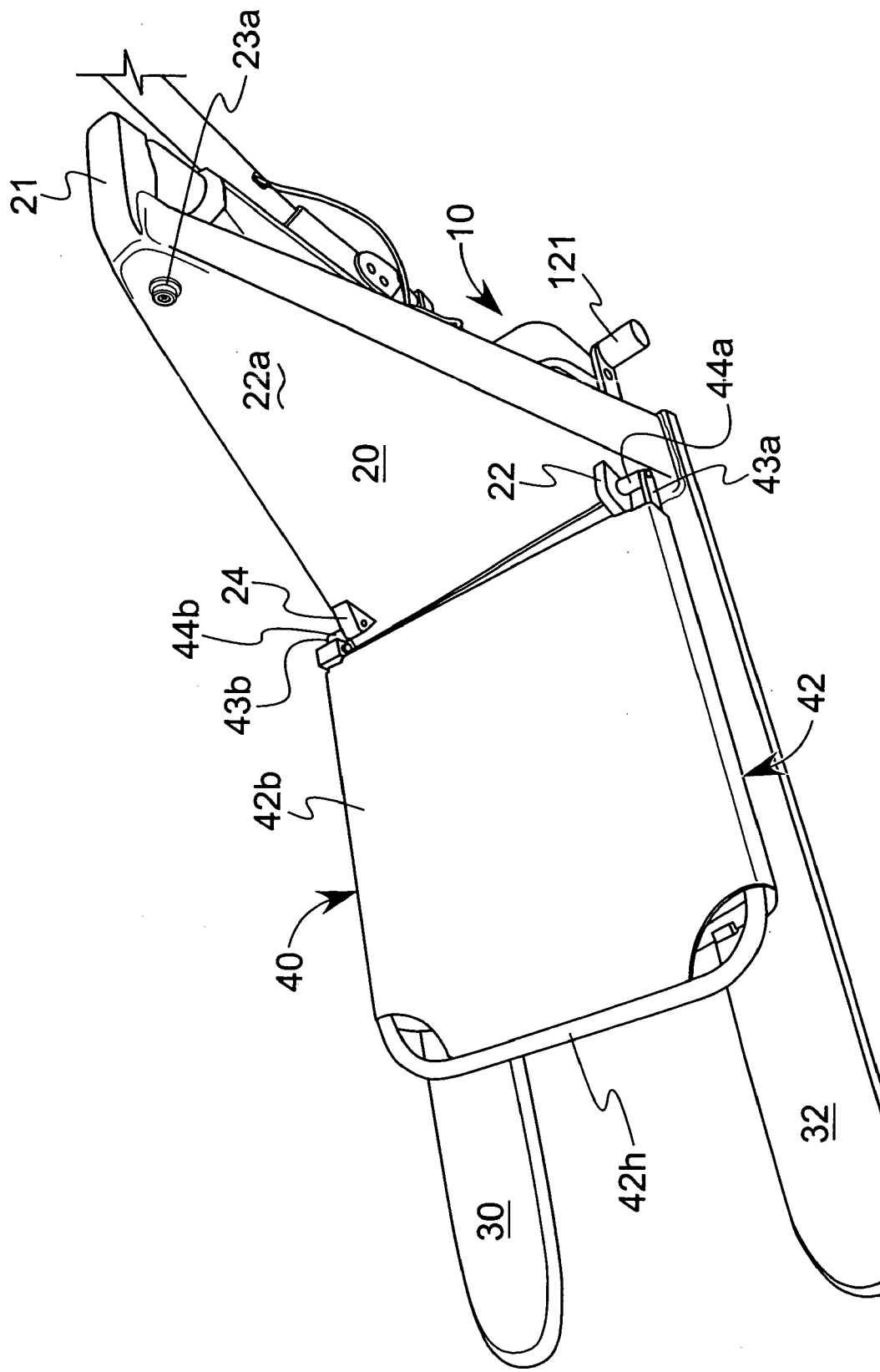
FIG. 6 is a perspective view of the pallet truck illustrated in FIGS. 1 and 2.
Figure 7:
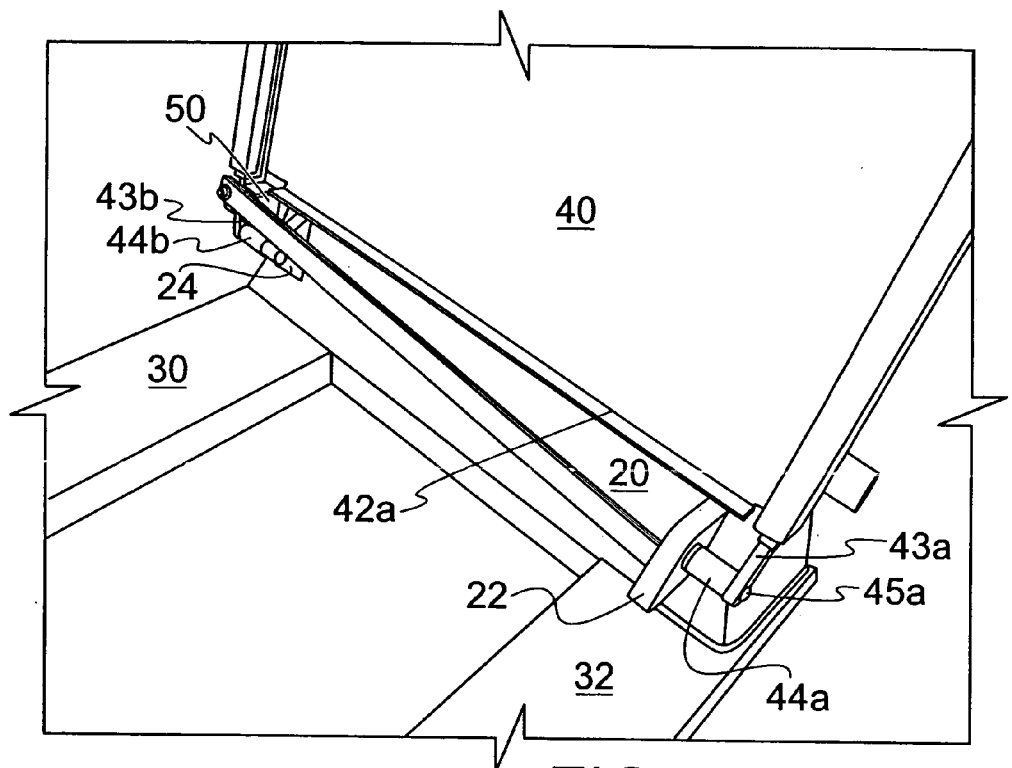
FIGS. 7–10 are views illustrating a torsion bar spring coupled to the tray and fork carriage via structure constructed in accordance with a first embodiment of the present invention.

As best illustrated in FIGS. 6–10, first and second connecting elements 22 and 24 are fixedly coupled to and extend outwardly from the fork carriage 20. The first section 42a of the planar workpiece-receiving structure 42 comprises first and second connector arms 43a and 43b. In FIG. 6, the second section 42b is shown in its fully retracted state where it substantially covers the entire first section 42a, except for the first and second connector arms 43a and 43b. A first spacer 44a is positioned between the first connecting element 22 and the first connector arm 43a. A second spacer 44b is positioned between the second connecting element 24 and the second connector arm 43b. A bolt 45a extends through the first arm 43a and the first spacer 44a and threadedly engages the first connecting element 22 so as to couple the first arm 43a and first spacer 44a to the first connecting element 22, and, wherein, the first arm 43a is rotatable relative to the first connecting element 22. A bolt 45b extends through the second arm 43b and the second spacer 44b and threadedly engages the second connecting element 24 so as to couple the second arm 43b, and the second spacer 44b to the second connecting element 24 and, wherein, the second arm 43b is rotatable relative to the second connecting element 24.

Figure 8:
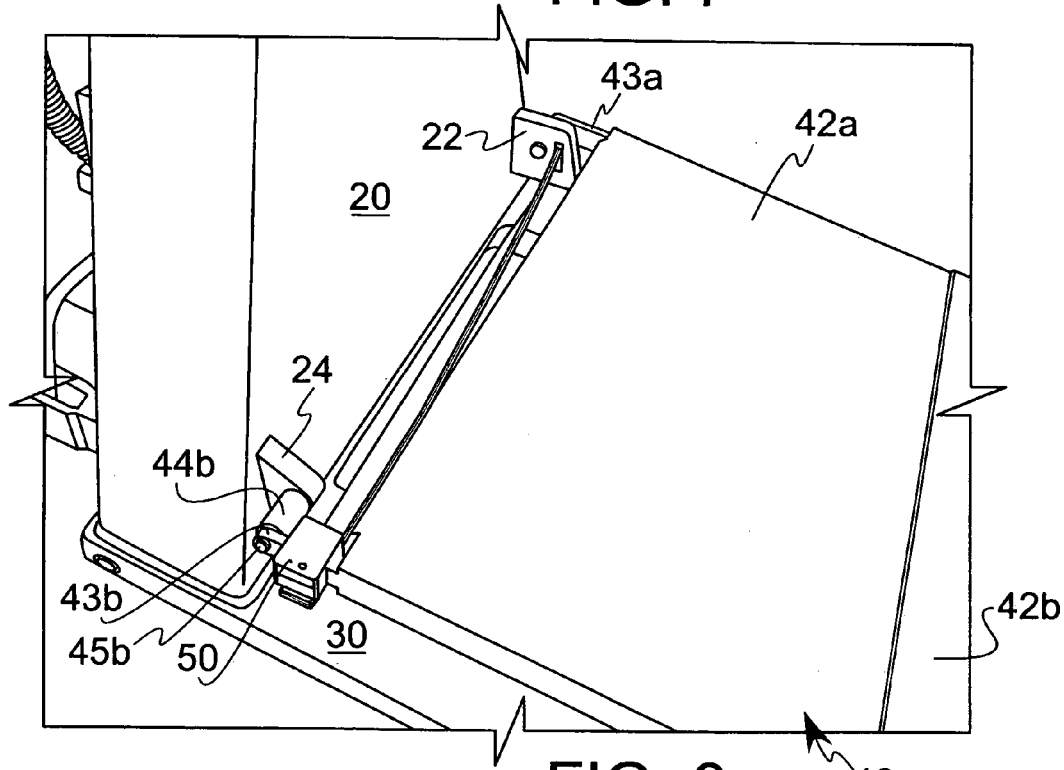
Figure 9:
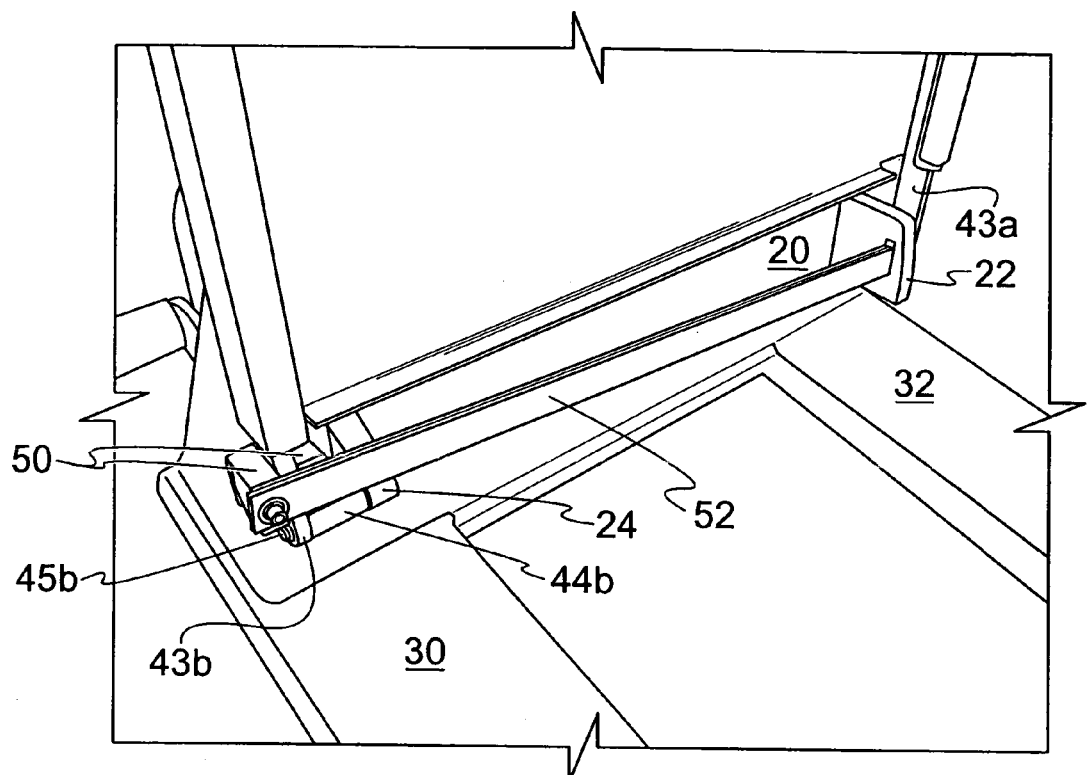
Figure 10:
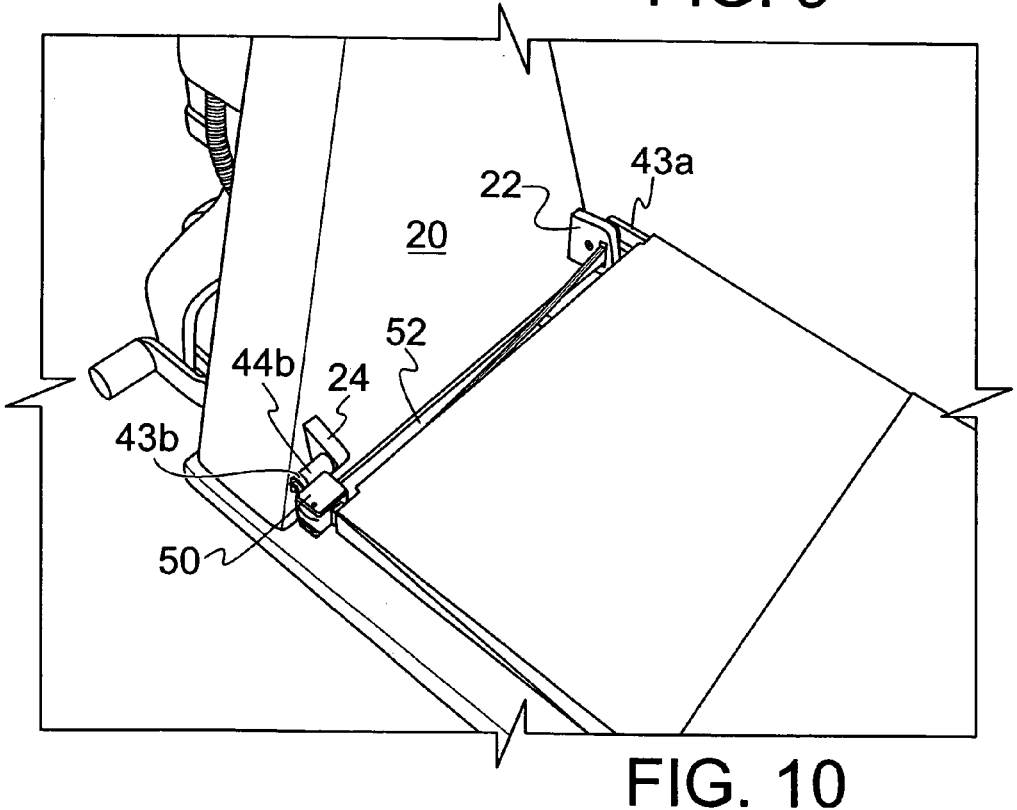

A torsion block or anchor 50 is fixedly mounted to opposing sides of the second arm 43b, see FIGS. 9 and 10. A steel torsion bar spring 52 is fixedly coupled to the first connecting element 22 and the torsion block 50, see FIGS. 7–10. The torsion bar spring 52 functions to apply a biasing force upon the tray 40 so as to assist an operator in moving the tray 40 between its workpiece-receiving position and its stowed position, and vice versa. When the tray 40 is in its workpiece-receiving position, as illustrated in FIGS. 6 and 8, the torsion bar spring is twisted approximately 90 degrees. The "twist" in the torsion bar spring 52 causes a counter-clockwise biasing force, as viewed in FIG. 8, to be generated by the torsion bar spring 52 through the torsion block 50 and the second arm 43b to the tray 40. The biasing force, however, is not sufficient to independently move the tray 40 from its workpiece-receiving position to its stowed position. Rather, an operator must manually apply an additional force to move the tray 40 to its stowed position.

In accordance with an alternative embodiment of the present invention, as illustrated in FIGS. 19–20, 20A, 20B and 21, wherein like reference numerals indicate like elements, first and second connecting elements 220 and 240 are fixedly coupled to and extend outwardly from the fork carriage 20. The first section 42a of the planar workpiece-receiving structure 42 comprises first and second connector arms 43a and 43b.

Figure 20:
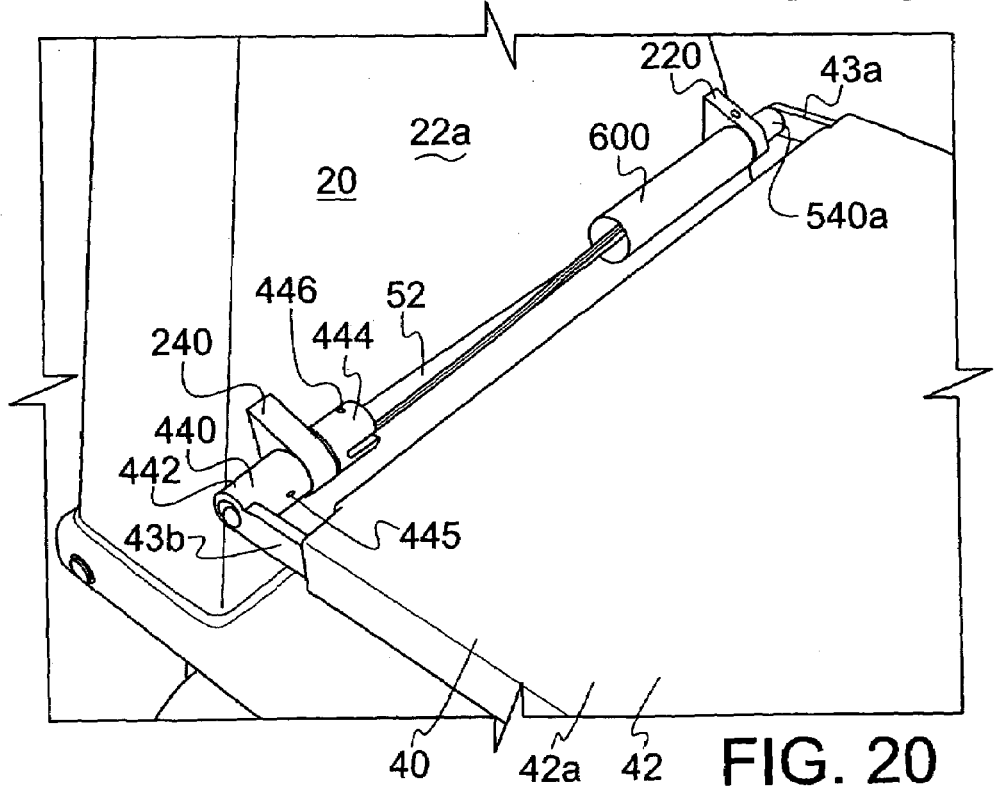
Figure 20A:
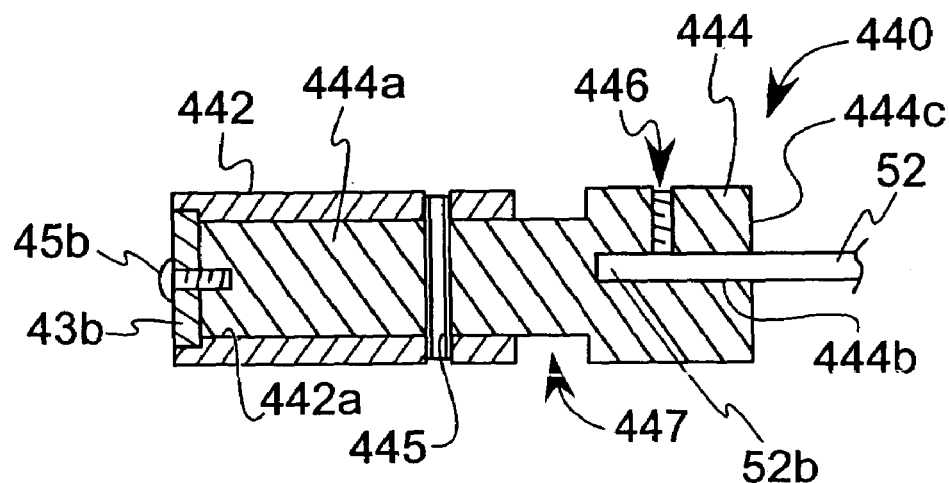
FIG. 20A is a view partially in cross section illustrating a second connecting device for coupling the torsion bar spring to the tray.
Figure 20B:
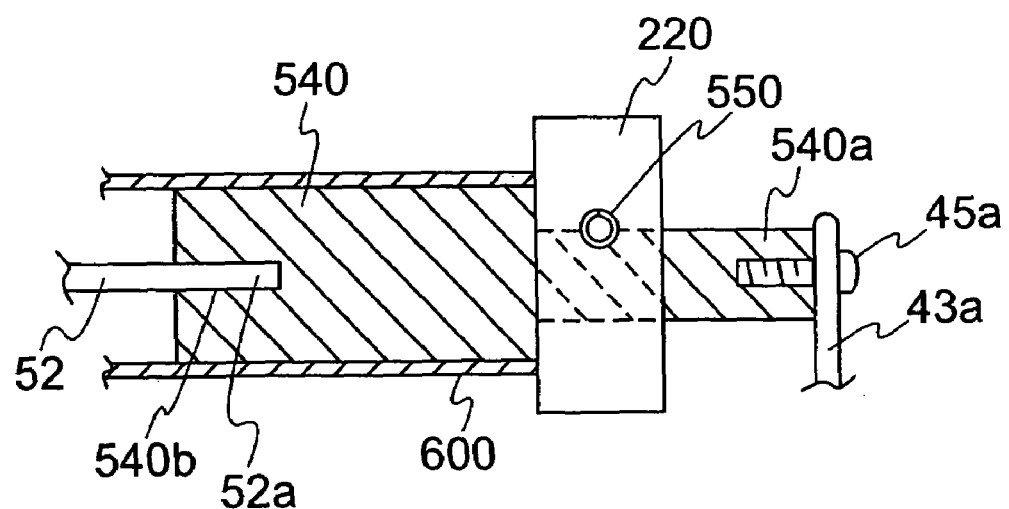
FIG. 20B is a view partially in cross section illustrating a first connecting device for coupling the torsion bar spring to the fork carriage.
Figure 21:
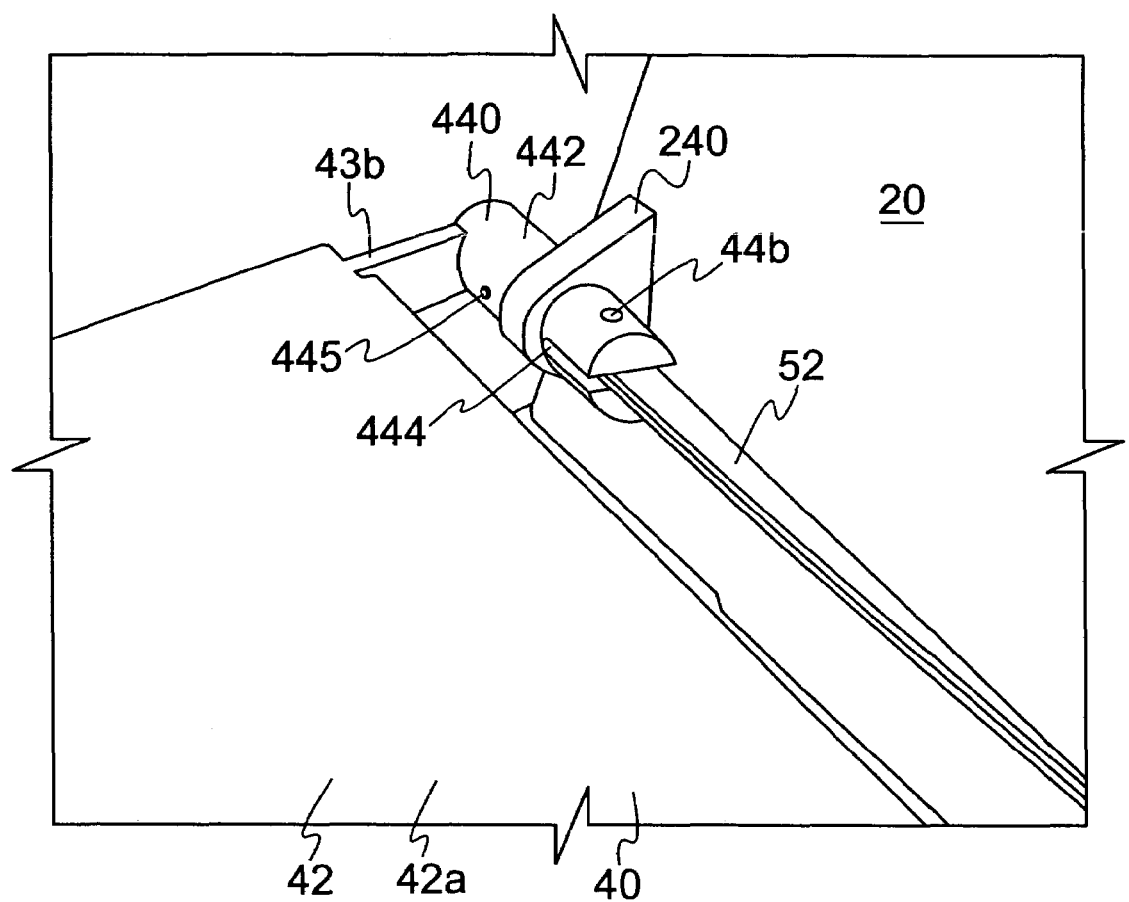

An extending portion 540a of a first connecting device 540 extends through an opening in the first connecting element 220 and is fixed to the first element 220 via a spring pin 550, see FIG. 20B. The first connecting device 540 is provided with a recess 540b for receiving a first end portion 52a of the torsion spring 52. A set screw (not shown) may be provided for coupling the spring 52 to the connecting device 540. A bolt 45a extends through the first arm 43a and threadedly engages with the extending portion 540a. A sufficient spacing is provided between the head of the bolt 45*a* and the extending portion 540*a* so as to allow the first arm 43*a* to rotate relative to the fixed first connecting device 540 and the first connecting element 220.

A generally cylindrical second connecting device 440 extends through an opening in the second connecting element 240 and is rotatable relative to the second connecting element 240. As is apparent from the cross-sectional view of FIG. 20A, the connecting device 440 comprises first and second sections 442 and 444. The first section 442 has a bore 442*a* for receiving an extending portion 444*a* of the second section 444. A spring pin 445 is provided for coupling the first and second sections 442 and 444 together such that the first and second sections 442 and 444 rotate together. Once the first and second sections 442 and 444 are coupled together, they define a recess 447 for receiving a bushing or bearing (not shown) associated with the second connecting element 240. A bolt 45*b* extends through the arm 43*b* and threadedly engages the extending portion 444*a* such that the second section 444 moves or rotates with the arm 43*b*.

The second section 444 of the connecting device 440 is provided with a slot 444*b* for receiving a second end portion 52*b* of the torsion bar spring 52. A set screw or pin 446 is provided for releasably coupling the spring 52 to the connecting device second section 444. Hence, the second end portion 52*b* of the spring 52 rotates with the connecting device 440.

Figure 19:
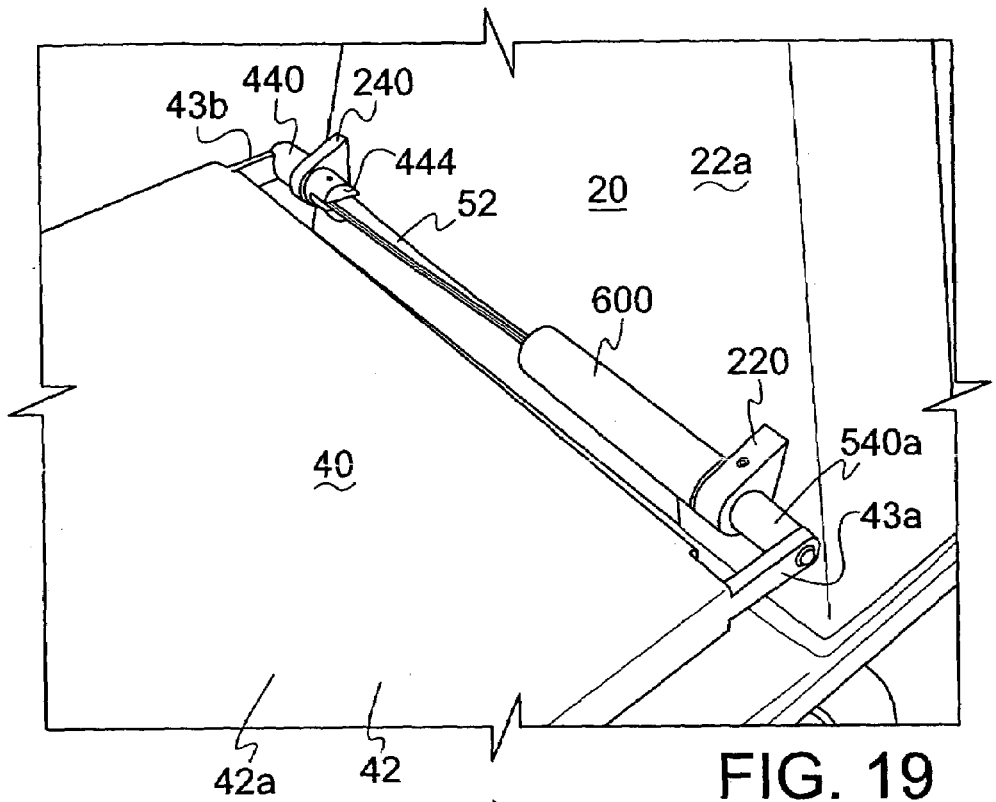
FIGS. 19, 20 and 21 are perspective views of an alternative arrangement for coupling a torsion bar spring to a tray and a fork carriage.

In the embodiment illustrated in FIGS. 19 and 20, an outer cover 600 is provided over the first end portion 52*a* of the torsion bar spring 52, and the first connecting device 540. It is contemplated that the cover 600 may have a length longer than that shown in FIGS. 19 and 20 such that it also covers a base portion 444*c* of the second section 444 of the second connecting device 440. Because the inner diameter of the cover 600 is only slightly larger than the width of the torsion bar spring 52, the outer cover 600 also functions to maintain the spring first end portion 52*a* within the slot 540*a* provided in the first connecting device 540. Hence, a set screw for coupling the spring 52 to the connecting device 540 is not required.

The torsion bar spring 52 functions to apply a biasing force upon the tray 40 so as to assist an operator in moving the tray 40 between its workpiece-receiving position and its stowed position, and vice versa.

As noted above, the second section 42*b* of the workpiece-receiving structure 42 is capable of being moved relative to the first section 42*a* between a fully retracted position, as shown in FIGS. 1, 4 and 6, and a fully extended position, as shown in FIGS. 2 and 5. The first section 42*a* comprises a substantially planar plate member 143*a*, and first and second generally C-shaped members 143*b* and 143*c* extending from outer edges of the plate member 143*a*, see FIGS. 5, 11 and 12, which elements may be formed as a single integral part or comprise discrete parts which are coupled, such as by welding, to one another. The second section 42*b* comprises a substantially planar plate member 42*c*, first and second generally C-shaped members 42*d* and 42*e* extending from outer edges of the plate member 42*c*, and a tubular handle portion 142, which elements may be formed as a single integral part or comprise discrete parts which are coupled, such as by welding, to one another. Openings 142*a* and 142*b* are provided in the plate member 42*c* to allow an operator to grip the handle portion 142. A pair of first and second stops 42*f* and 42*g* are fixedly coupled at appropriate locations to the second section C-shaped members 42*d* and 42*e*, see FIGS. 5 and 11. When the second section 42*b* is fully extended, the stops 42*f* and 42*g* engage the first support element 44 on the first section 42*a*. Hence, the fully extended position of the second section 42*b* relative to the first section 42*a* is defined by the locations of the stops 42*f* and 42*g* on the second section 42*b* as well as the location of the first support element 44 on the first section 42*a*.

Figure 15:
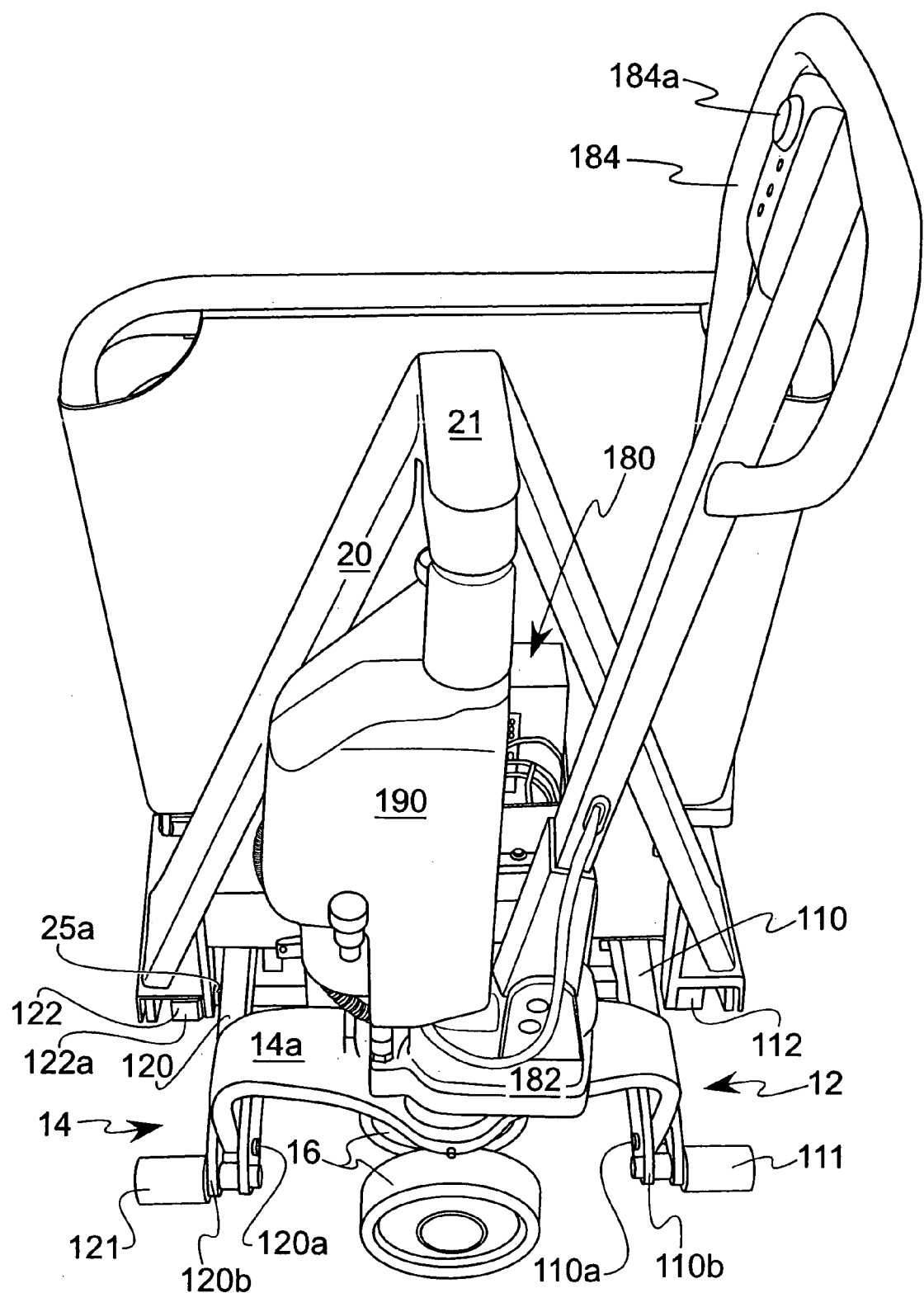
FIG. 15 is a perspective view of the truck of FIGS. 1 and 2 illustrating the steerable unit, fork carriage and tray.

Preferably, when the second section 42*b* of the workpiece-receiving structure 42 is moved to its fully retracted position and the tray 40 is moved to its stowed position, see FIGS. 3, 4, and 15, the distal end 42*h* of the second section 42*b*, defined by the outermost portion of the handle portion 142, is substantially coextensive with an uppermost outer end 21 of the fork carriage or extends only a small distance, such as up to about 3 inches, beyond the uppermost outer end 21 of the fork carriage 20, see FIG. 3. It is also contemplated that the distal end 42*h* may extend below the uppermost outer end 21 of the fork carriage 20. Because the distal end 42*h* of the second section 42*b* extends no more than a small distance beyond or above the outer end 21 of the fork carriage 20, the second section 42*b* of the workpiece-receiving structure 42 is less likely to obstruct the view of an operator as he/she operates the truck 10.

Figure 14:
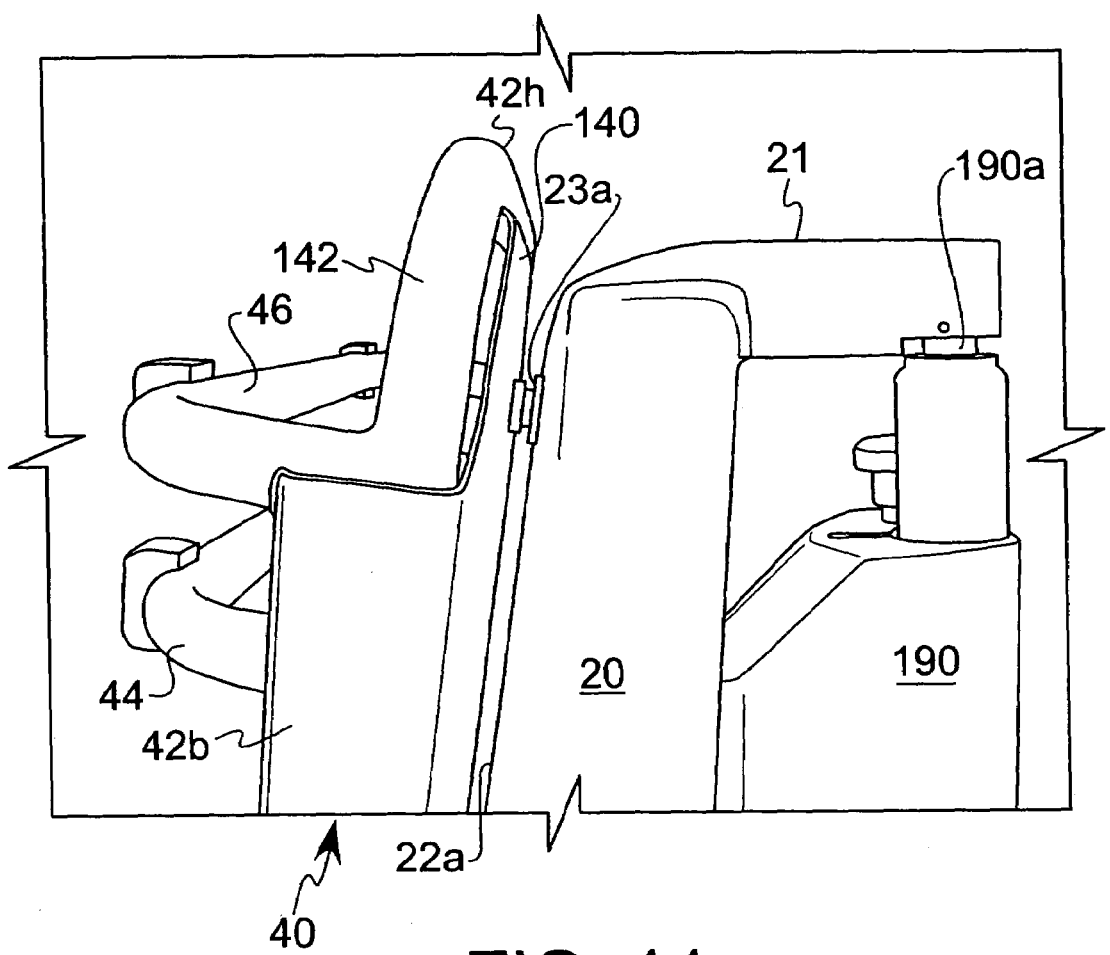
FIG. 14 is a side view of a portion of the truck illustrating a button element for locking the tray in a stowed position.
Figure 14A:
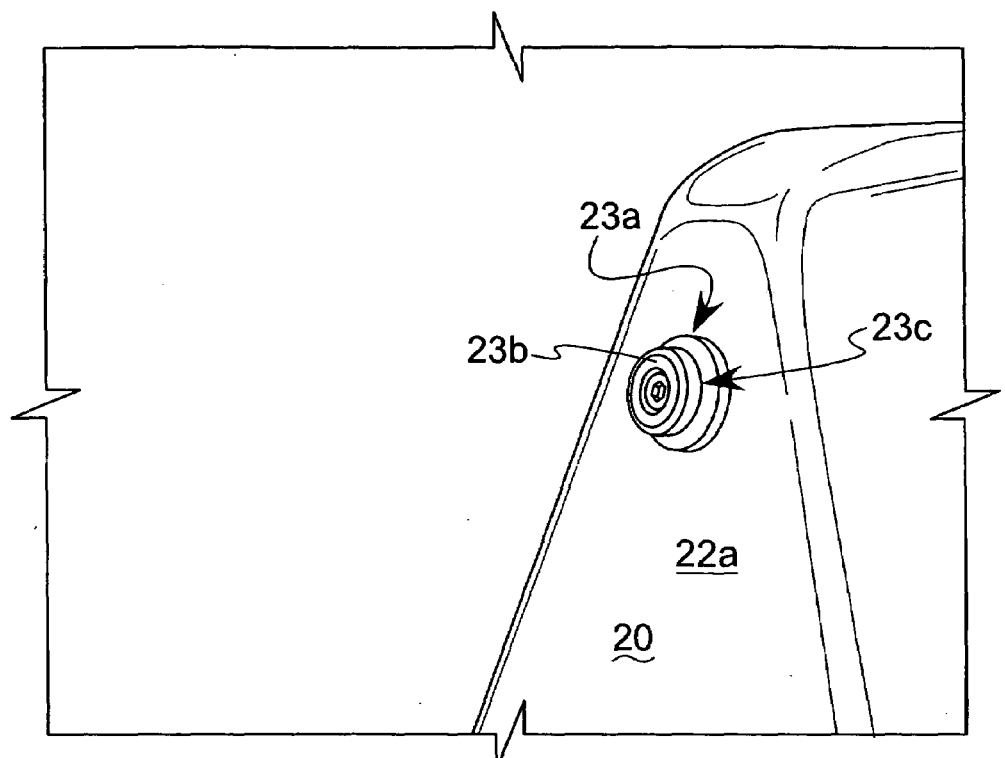
FIG. 14A is a perspective view of a portion of the fork carriage illustrating the button element shown in FIG. 14.
Figure 14B:
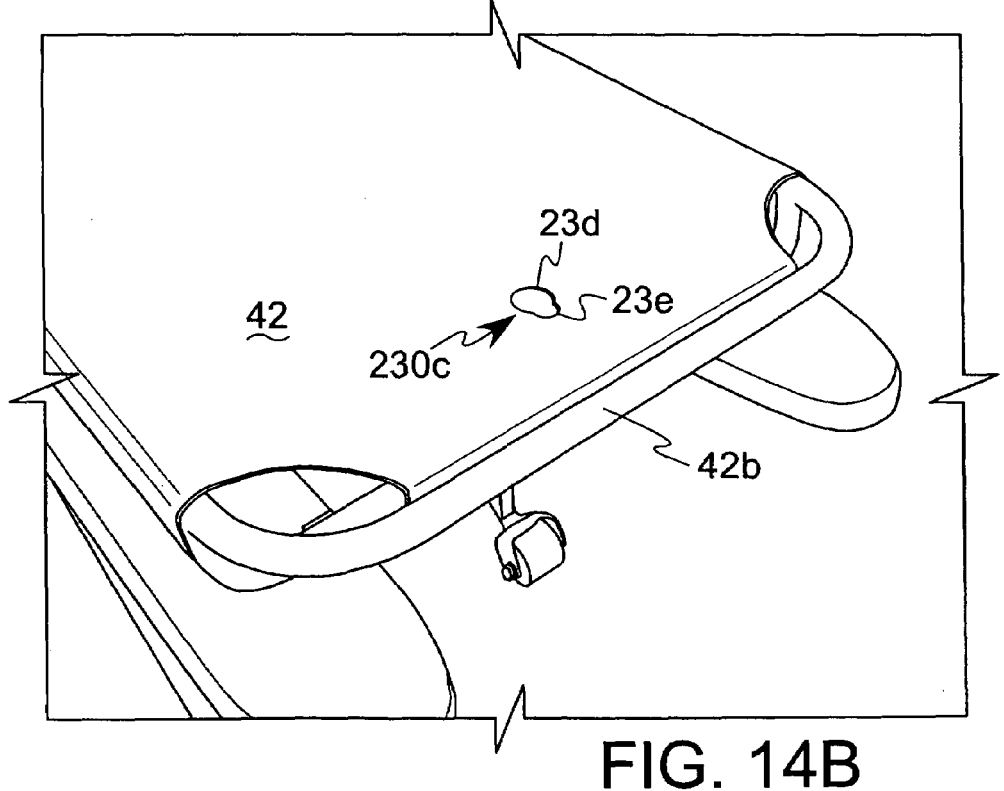
FIG. 14B is a perspective view illustrating a slot in the tray for receiving the button element.
Figure 14C:
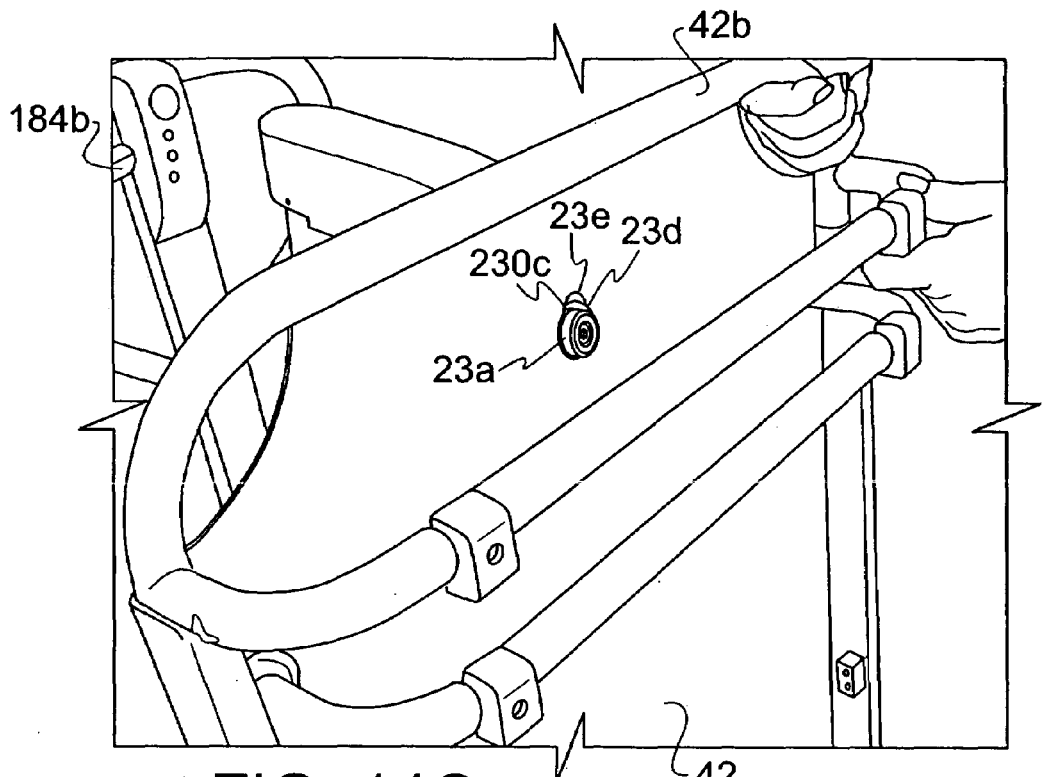
FIGS. 14C and 14D are perspective views illustrating the button element inserted into the tray slot.
Figure 14D:
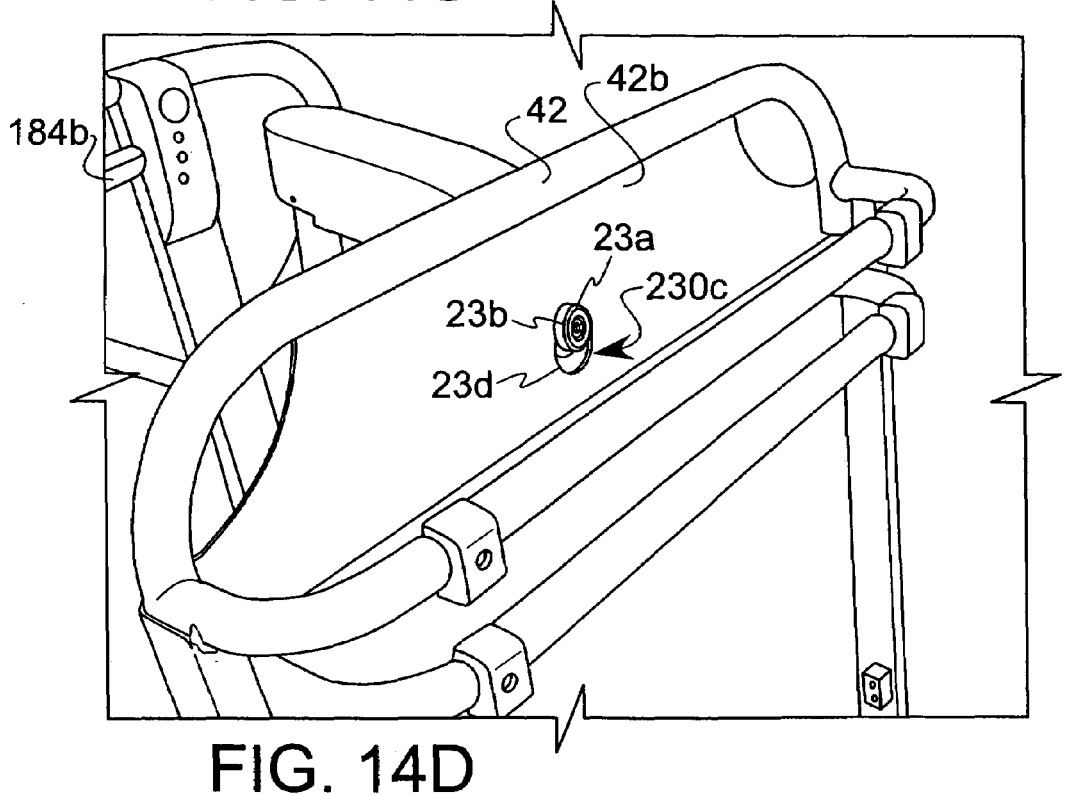

The fork carriage 20 includes an outer front surface or face 22*a* which defines an obtuse angle with the forks 30 and 32, see FIG. 3. Due to this angle being greater than 90 degrees, the tray 40 is assisted in being maintained it in its stowed position via gravity. So as to lock the tray 40 in its stowed position, a button element 23*a* is located on the front surface 22*a* of the fork carriage 20. The button element 23*a* comprises a head portion 23*b* and an annular groove 23*c* positioned below the head portion 23*b* and having a diameter less than that of the head portion 23*b*, see FIG. 14A (the button element 23*a* is not shown in FIGS. 1 and 2). The button element 23*a* is received in a slot 230*c* provided in the planar workpiece-receiving structure 42, see FIG. 14B (the slot 230*c* is not illustrated in FIGS. 4, 5, 6, 13). The slot 230*c* comprises a first portion 23*d* sized to receive the button element head portion 23*b* and a second portion 23*e* sized to fit within the annular groove 23*c*. The second portion 23*e* has a width smaller than the diameter of the head portion 23*b*. So as to interlock the button element 23*a* with the workpiece-receiving structure 42, an operator positions the second section 42*b* of the workpiece-receiving structure 42 such that the head portion 23*b* is permitted to pass through the slot first portion 23*d*, see FIG. 14C. An operator then allows the second section 42*b* to move downward, see FIG. 14D, such that the slot second portion 23*e* is received in the button element annular groove 23*c*. It is also contemplated that first and second button elements (not shown) may be provided on the carriage front surface 22*a* and the workpiece-receiving structure 42 so as to releasably interlock with one another via magnetic attraction, snap fit elements or the like.

The steerable support unit 12 comprises a base structure 14 including a pair of steerable wheels 16, a pair of first and second scissor arms 110 and 112 and a pair of third and fourth scissor arms 120 and 122, see FIGS. 1–4 and 15.

The base structure 14 further comprises a U-shaped frame 14*a* and a hydraulic lift apparatus 180, see FIGS. 3 and 15. The hydraulic lift apparatus 180 comprises a platform 182 fixedly coupled to a shaft (not shown) which extends through the U-shaped frame 14*a*. The steerable wheels 16 are also fixedly coupled to the shaft such that rotational movement of the platform 182 effects rotational movement of the wheels 16. A handle 184 is pivotably coupled to the platform 182. Side-to-side movement of the handle 184 effects rotational movement of the platform 182 and the wheels 16 and, hence, provides a means to steer the truck 10.

The first scissor arm 110 is pivotably coupled at its first end (not shown) to the first fork 30 via a sliding pin (not shown) moving within a track element (not shown) coupled to the underside of the fork 30. The first arm 110 is also pivotably coupled to the U-shaped frame 14a via pin 110a, see FIGS. 1, 4 and 15. A first foot 111 is rotatably coupled to the first arm 110 at a second end 110b of the first arm 110. The second scissor arm 112 is pivotably coupled at its first end 112a to the fork carriage 20 via a pin 25, see FIGS. 1, 2 and 4. A first roller 130 is rotatably coupled to second arm 112 at its second end 112b. A pivot pin 113 joins the first and second arms 110 and 112 at approximately mid-way points along their lengths.

The third scissor arm 120 is pivotably coupled at its first end (not shown) to the second fork 32 via a sliding pin (not shown) moving within a track element (not shown) coupled to the underside of the fork 32. The third arm 120 is also pivotably coupled to the U-shaped unit 14a via a pin 120a, see FIG. 15. A second foot 121 is rotatably coupled to the second arm 120 at a second end 120b of the second arm 120. The fourth scissor arm 122 is pivotably coupled at its first end 122a to the fork carriage 20 via a pin 25a, see FIG. 15. A second roller 132 is rotatably coupled to the second end 122b of the fourth arm 122, see FIGS. 1, 2 and 4. A pivot pin (not shown) joins the third and fourth arms 120 and 122 at approximately mid-way points along their lengths.

The hydraulic lift apparatus 180 further comprises an electric-motor-driven pump/piston/cylinder unit 190 mounted on the platform 182, see FIGS. 3 and 15. The piston 190a of the unit 190 is coupled to the fork carriage 20. A switch 184a is provided on the handle 184, see FIG. 15. Actuation of the switch 184a causes the drive motor of the pump to be actuated such that the piston 190a is caused to raise the forks 30, 32 relative to the U-shaped frame 14a. As the piston raises the forks 30, 32, the first, second, third and four scissor arms 110, 112, 120, 122 unfold so as to provide support for the forks 30, 32. Upward movement of a trigger 184b causes the unit 190 to lower the forks 30, 32, see FIG. 1.

It is alternatively contemplated that the hydraulic lift apparatus 180 may comprise a manually actuated pump (not shown) coupled to a piston/cylinder unit (not shown) mounted on the platform 182 and having a piston coupled to the fork carriage 20, instead of the electric-motor-driven unit 190. The pump is housed in the platform 182.

Figure 16:
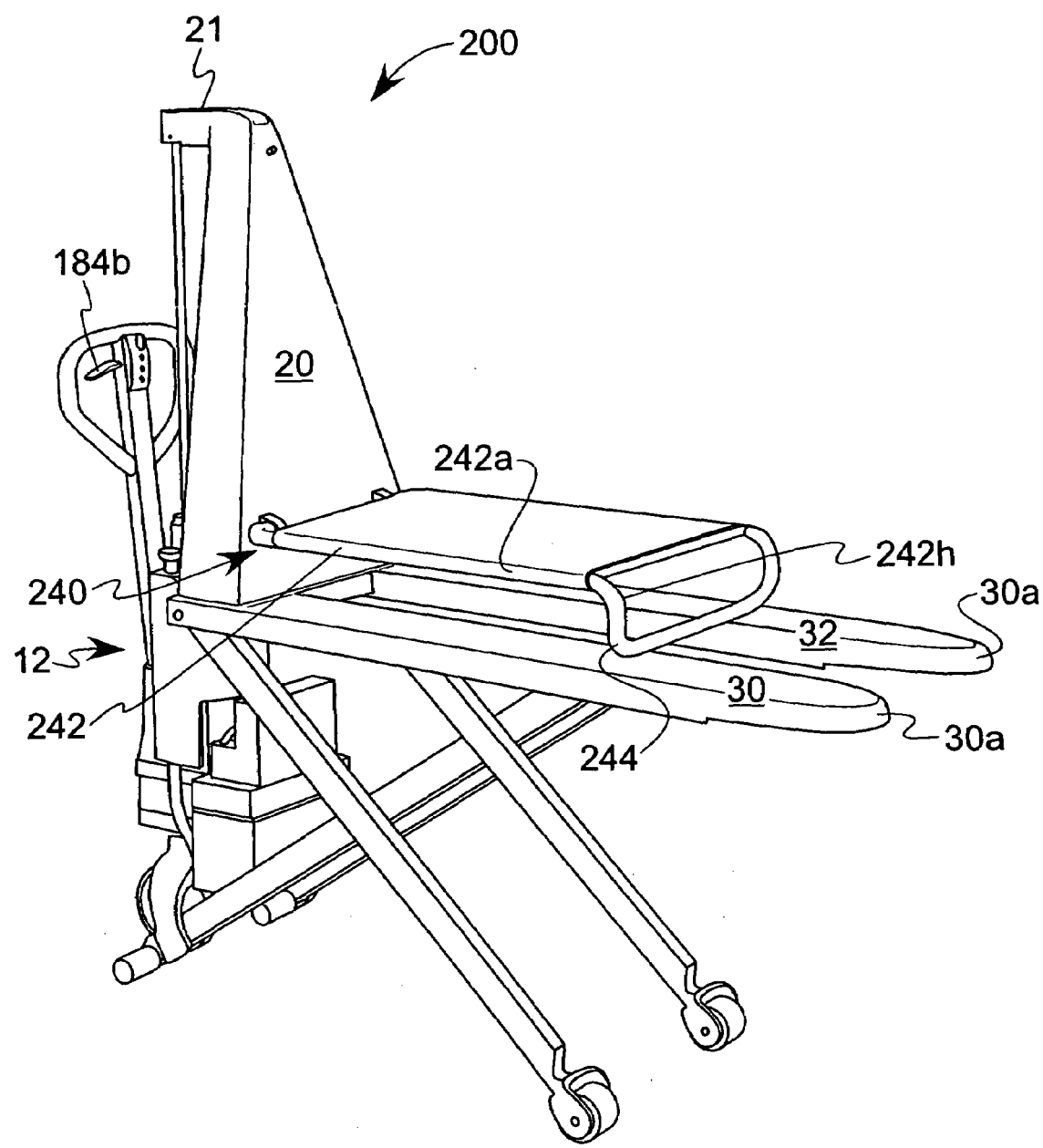
FIGS. 16–18 are perspective views of a pallet truck constructed in accordance with a second embodiment of the present invention.
Figure 17:
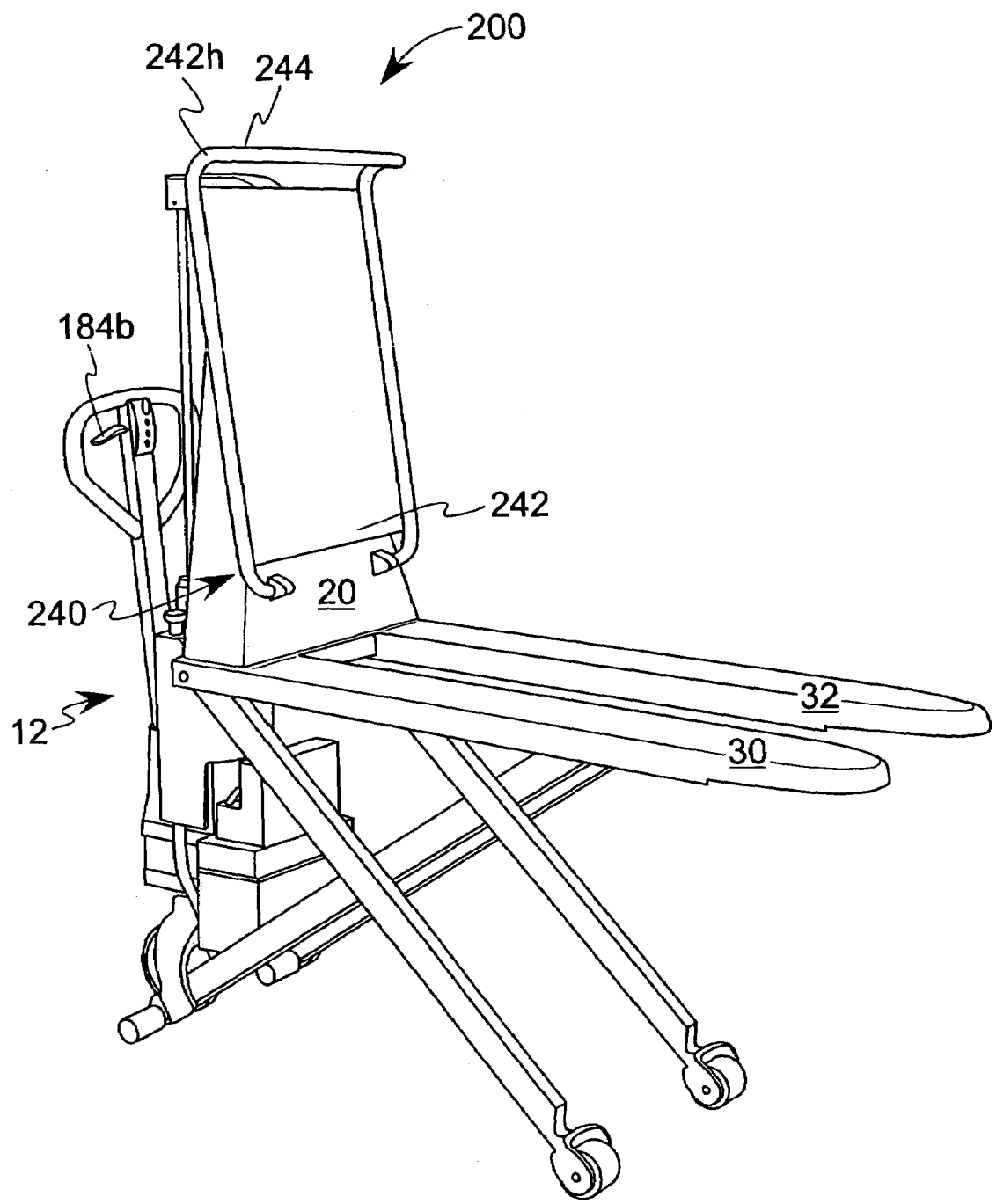
Figure 18:
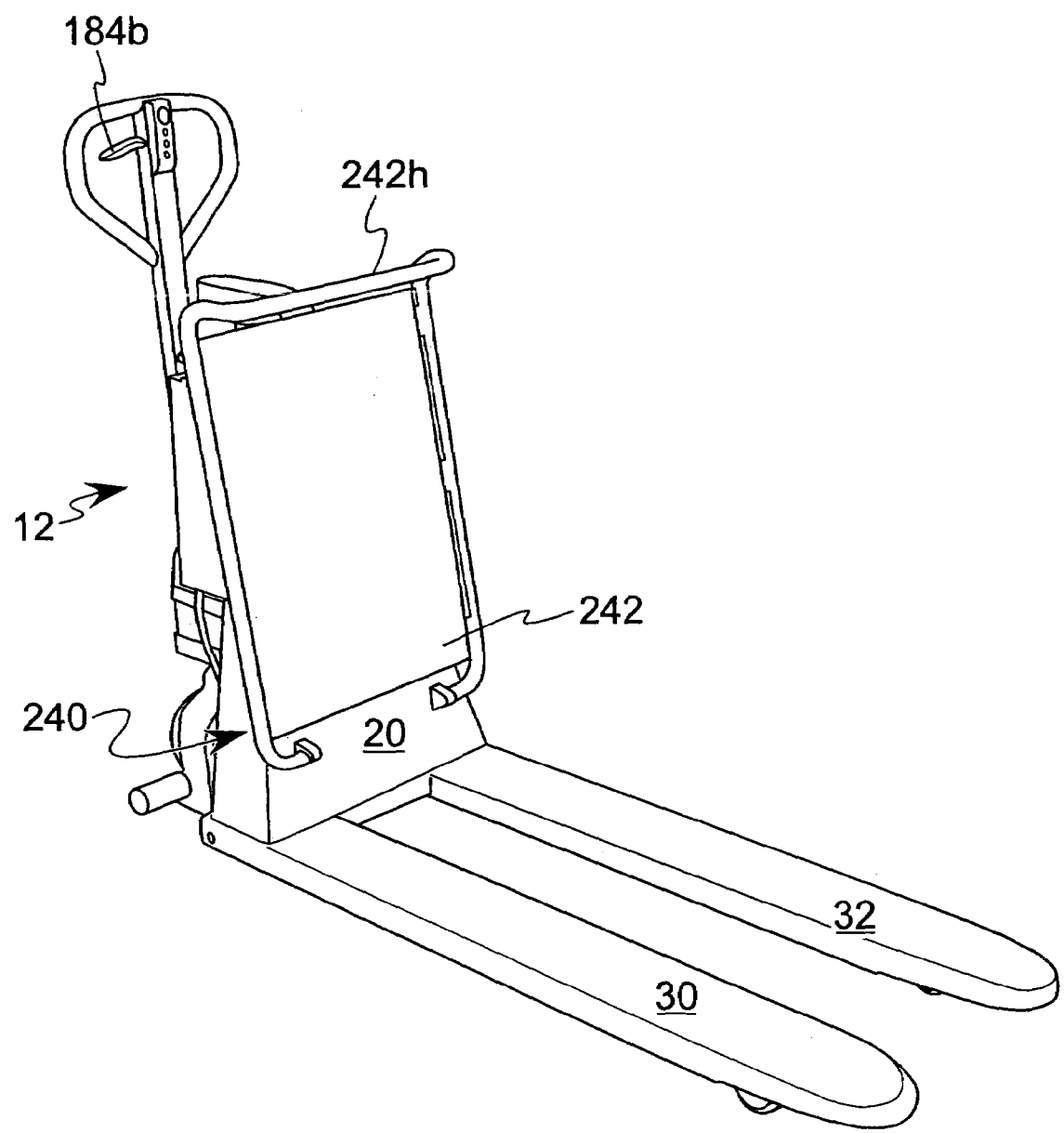

A pallet truck 200 constructed in accordance with a second embodiment of the present invention is illustrated in FIGS. 16–18, wherein like reference numerals indicate like elements. The pallet truck 200 comprises a steerable unit 12, a fork carriage 20, first and second forks 30 and 32, and a tray 240. The tray 240 is pivotably coupled to the fork carriage 20. The tray 240 comprises a substantially planar workpiece-receiving structure 242 and a single support element 244 weldably coupled to the planar workpiece-receiving structure 242. The workpiece-receiving structure 242 comprises only a single section 242a. When the tray 240 is in its workpiece-engaging position, as shown in FIG. 16, a distal end 242h of the workpiece-receiving structure 242 is spaced approximately 15 inches inward from the distal ends 30a, 32a of the forks 30, 32. It is also contemplated that the distal end 242h may extend so as to be slightly in-board of or substantially in-line with the distal ends 30a, 32a of the forks 30, 32, or even extend a small distance beyond the fork distal ends 30a, 32a, for example, up to about 6 inches beyond the distal ends 30a, 32a of the forks 30, 32. In the event that the distal end 242h of the workpiece-receiving structure 242 extends above the uppermost outer end 21 of the fork carriage 20 when the tray 240 is in its stowed position, it is preferred that the tray 240 be formed from a material which comprises a substantially see-through material, such as a metal mesh material, a substantially clear polymeric material or a perforated metal. Such a material will provide an operator with some degree of visibility through the portion of the tray 240 extending above the uppermost outer end 21 of the fork carriage 20.

It is also contemplated that the tray 40, 240 may be pivotally coupled by conventional mounting structure to the forks 30, 32.

It is additionally contemplated that a damping unit (not shown), such as a piston/cylinder unit, may be mounted between the second section 42b of the workpiece-receiving structure 42 and one of the first section 42a of the workpiece-receiving structure 42 and the fork carriage 20 so as to limit and/or control the movement of the second section 42b as it is moved from its fully extended position to its fully retracted position.

The foregoing description of preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A pallet truck comprising:
    a steerable unit;
    a fork carriage;
    a set of forks coupled to said fork carriage; and
    a tray non-removably coupled to one of said fork carriage and said forks and being movable between a workpiece-receiving position where said tray rests on said forks and a stowed position where said tray is disengaged from said forks, said tray comprising a substantially planar workpiece-receiving structure pivotably coupled to said carriage, and a support element coupled to said planar workpiece-receiving structure and adapted to contact said forks when said tray is in said workpiece-receiving position.

2. A pallet truck as set forth in claim 1, wherein at least a portion of said substantially planar workpiece-receiving structure is formed from a substantially see-through material.

3. A pallet truck as set forth in claim 2, wherein said substantially see-through material comprises at least one of a metal mesh material, a substantially clear polymeric material and a perforated metal sheet material.

4. A pallet truck as set forth in claim 1, wherein said workpiece-receiving structure and said at least one support element have a height so as to extend from about 1 inch to about 12 inches above the forks when in the workpiece-receiving position.

5. A pallet truck as set forth in claim 1, wherein said carriage includes an outer surface defining a stop against which said tray rests when positioned in said stowed position, said outer surface defining an obtuse angle with said forks such that said tray is maintained in its stowed position against said carriage outer surface via gravity.

6. A pallet truck as set forth in claim 1, wherein said fork carriage includes an outer surface and an attachment device associated with said outer surface for securing said tray against said outer surface when said tray is in its stowed position.

7. A pallet truck as set forth in claim 1, wherein said steerable unit comprises:
a base structure including at least one steerable wheel;
a pair of first and second scissor arms, said first scissor arm being coupled at a first end to one of said forks and further being coupled to said base structure and said second arm being coupled at a first end to said fork carriage and having a roller coupled to its second end;
a pair of third and fourth scissor arms, said third arm being coupled at a first end to one of said forks and further being coupled to said base structure and said fourth arm being coupled at a first end to said fork carriage and having a roller coupled to its second end.

8. A pallet truck as set forth in claim 7, wherein said steerable unit further comprises a first foot coupled to a second end of said first arm and a second foot coupled to a second end of said third arm.

9. A pallet truck as set forth in claim 7, wherein said base structure comprises a frame, said at least one steerable wheel rotatably coupled to said frame and a lift apparatus associated with said frame for raising said fork carriage and said forks relative to said frame.

10. A pallet truck comprising:
a steerable unit;
a fork carriage;
a set of forks coupled to said fork carriage; and
a tray non-removably coupled to one of said fork carriage and said forks and being movable between a workpiece-receiving position where said tray rests on said forks and a stowed position where said tray is disengaged from said forks, said tray being pivotably coupled to said fork carriage and further comprising a biasing element coupled between said tray and said fork carriage for biasing said tray in a direction towards its stowed position.

11. A pallet truck as set forth in claim 10, wherein said biasing element comprises a torsion bar.

12. A pallet truck comprising:
a main unit;
a set of forks coupled to said main unit; and
a tray non-removably coupled to one of said main unit and said forks and being movable between a workpiece-receiving position where said tray rests on said forks and a stowed position where said tray is disengaged from said forks, said tray comprising a substantially planar workpiece-receiving structure pivotably coupled to said main unit, and a support element coupled to said planar workpiece-receiving structure and adapted to contact said forks when said tray is in said workpiece-receiving position.

13. A pallet truck as set forth in claim 12, wherein said main unit comprises a steerable unit and a fork carriage.

14. A pallet truck as set forth in claim 12, wherein at least a portion of said substantially planar workpiece-receiving structure is formed, from a substantially see-through material.

15. A pallet truck as set forth in claim 14, wherein said substantially see-through material comprises at least one of a metal mesh material, a substantially clear polymeric material and a perforated metal sheet material.

16. A pallet truck as set forth in claim 12, wherein said workpiece-receiving structure and said at least one support element have a height so as to extend from about 1 inch to about 12 inches above the forks when in the workpiece-receiving position.

17. A pallet truck comprising:
a main unit;
a set of forks coupled to said main unit; and
a tray non-removably coupled to one of said main unit and said forks and being movable between a workpiece-receiving position where said tray rests on said forks and a stowed position where said tray is disengaged from said forks, said tray being pivotably coupled to said main unit and further comprising a biasing element coupled between said tray and said main unit for biasing said tray in a direction towards its stowed position.

18. A pallet truck as set forth in claim 17, wherein said biasing element comprises a torsion bar.

* * * * *